(12) United States Patent
Blutke et al.

(10) Patent No.: US 7,279,655 B2
(45) Date of Patent: Oct. 9, 2007

(54) INDUCTIVELY COUPLED PLASMA/PARTIAL OXIDATION REFORMATION OF CARBONACEOUS COMPOUNDS TO PRODUCE FUEL FOR ENERGY PRODUCTION

(75) Inventors: Andreas Blutke, Richland, WA (US); John Vavruska, Santa Fe, NM (US); Mark Henderson, Pasco, WA (US); Robert Ferguson, Richland, WA (US)

(73) Assignee: Plasmet Corporation, Walla Walla, WA (US)

( * ) Notice: Subject to any disclaimer, the term of this patent is extended or adjusted under 35 U.S.C. 154(b) by 196 days.

(21) Appl. No.: 10/865,679

(22) Filed: Jun. 10, 2004

(65) Prior Publication Data

US 2004/0251241 A1 Dec. 16, 2004

Related U.S. Application Data

(60) Provisional application No. 60/477,718, filed on Jun. 11, 2003.

(51) Int. Cl.
*B23K 10/00* (2006.01)
(52) U.S. Cl. .................... 219/121.59; 219/121.48; 429/20; 110/211; 110/345
(58) Field of Classification Search ........... 219/121.36, 219/121.59, 121.52, 121.54, 121.48; 429/19, 429/20; 110/246, 346, 250, 216; 588/900
See application file for complete search history.

(56) References Cited

U.S. PATENT DOCUMENTS

| | | | | |
|---|---|---|---|---|
| 4,644,877 A | * | 2/1987 | Barton et al. ............... | 588/311 |
| 5,288,969 A | * | 2/1994 | Wong et al. ............ | 219/121.52 |
| 5,484,978 A | * | 1/1996 | Hedberg et al. ....... | 219/121.59 |
| 5,611,947 A | | 3/1997 | Vavruska ............... | 219/121.52 |
| 5,809,911 A | * | 9/1998 | Feizollahi ................... | 110/346 |
| 6,153,852 A | | 11/2000 | Blutke et al. .......... | 219/121.59 |
| 2005/0158594 A1 | * | 7/2005 | Ahmed ........................ | 429/19 |

* cited by examiner

*Primary Examiner*—Mark Paschall
(74) *Attorney, Agent, or Firm*—Ronald M. Anderson

(57) ABSTRACT

Inductively coupled plasma (ICP) reforming converts carbonaceous compounds into a fuel for use in generating electrical power. Energy rich hydrocarbon fuels, such as coal, marine diesel, oils, and hydrocarbon wastes are employed as a feedstock for the ICP, which transforms the feedstock into a fuel that can be used by fuel cells and gas turbines for the production of electricity. The overall efficiency of an ICP-based electrical power system can be increased by providing partial oxidation within the reaction vessel. The partial oxidation conditions consume a small amount of the reformed fuel gas, thereby liberating sufficient thermal energy to reduce the electrical power requirements of the ICP to maintain desired reactor temperatures, and providing an increase in the overall net electrical power production. The integrated power production system can also adjust to meet an increased requirement for process heat and steam by balancing the effect of partial oxidation.

29 Claims, 14 Drawing Sheets

INDUCTIVELY COUPLED PLASMA/PARTIAL OXIDATION REFORMATION OF CARBONACEOUS COMPOUNDS TO PRODUCE FUEL FOR ENERGY PRODUCTION

RELATED APPLICATION

This application is based on prior copending provisional application Ser. No. 60/477,718, filed on Jun. 11, 2003, the benefit of the filing date of which is hereby claimed under 35 U.S.C. § 119(e).

FIELD OF THE INVENTION

The present invention generally relates to a method and apparatus for using an inductively coupled plasma (ICP) torch to convert various hydrocarbons into fuel gas, and more specifically, to a method and apparatus for efficiently reforming carbonaceous compounds into fuel gas, and using the fuel gas for a net production of energy.

BACKGROUND OF THE INVENTION

The vast majority of the electricity generated in the United States. is produced at large, centralized power stations, and then transmitted over high voltage power lines to remote customers. Such power transmission lines often distribute electricity many hundreds of miles away from the point of generation. Even using relatively high voltage levels to reduce current levels, the resistive losses involved in power transmission in this country is substantial.

From a historical perspective, such centralized power generation makes sense, since throughout the first half of the twentieth century, virtually all of this power was provided by steam-based power plants. Such plants operate by burning fossil fuels, predominantly coal, to boil water and produce steam. This steam passes through and rotates a turbine, driving a generator to produce electricity. Steady increases in steam technology translated into improved efficiency (measured by the amount of electricity generated per unit of fuel consumed), resulting in steady declines in the cost to produce power. Economies of scale favored the construction of large centralized facilities. Smaller turbines were less efficient, and few alternative technologies were available.

Natural gas-fired turbines have become the second most prevalent form of fossil-fueled electric power generating technology. These systems use the heat from the combustion process to accelerate combustion products through and rotate a turbine. The spinning turbine drives a generator to produce electricity. Such simple-cycle gas turbines can be improved by capturing the waste heat from the turbine exhaust to create steam, which is used to drive a steam turbine and produce additional electrical power. Theses combined-cycle gas turbine systems (CCGT) are more efficient (40-50%) than simple-cycle systems (25-35%) and coal-fired steam turbine plants (30-40%).

However, by the end of the century, the capital costs associated with building large centralized electric power generating facilities, the significant cost of providing thousands of miles of electrical transmission lines to distribute the electricity to those areas requiring electricity, and the emergence of technologies capable of competing with the costs and efficiencies of the by now mature turbine technologies, have enabled distributed electrical power generation to become a reasonable alternative to centralized electrical power production. This advantage is particularly true in locations where increasing demands for electricity will require significant capital expenditures to provide new transmission lines to bring additional electrical power from remote locations. Transmission losses can also be substantially reduced by using a more distributed power generation system.

Co-generation can provide a further advantage to distributed power systems. In a centralized electric power generating plant, enormous amounts of thermal energy (in the form of steam having insufficient pressure to drive a turbine) are unused and wasted. In fact, centralized electric power generating plants often require expensive systems to condense the unusable steam back into water, to be reheated once again to form usable stream. In urban areas, it is common to provide heating facilities that burn fuel oil or natural gas to provide heat, but do not produce electrical energy. However, in a co-generation facility, combustion of a hydrocarbon fuel can produce electrical power, and the remaining "waste" heat can be used for heating and cooling buildings and other facilities, eliminating the need to construct separate facilities. The use of waste heat from a smaller co-generation facility significantly improves its overall efficiency, even if the cost or efficiency of the electrical generation system alone is not on par with that achievable in a centralized larger power plant.

The ability of distributed power systems to compete effectively with centralized electrical power production became particularly apparent during the electrical power crisis experienced in the Western U.S. in the early part of 2001. As electrical rates soared, several municipalities and businesses turned to distributed electrical power generation as an alternative to purchasing the substantially more expensive electrical power available from centralized generating facilities. The city of Tacoma, Wash., embarked on a temporary diesel generator project (referred to as a generator farm) to gain relief from the uncertain spot market prices for electricity. The city of Tacoma estimates that during the nine-month period when this program was in effect, city consumers saved over $25 million compared to purchasing an equivalent amount of electricity from the centralized electrical power market.

Other municipalities are also aggressively pursuing distributed power alternatives. The New York Power Authority is seeking to obtain regulator approval to install eleven gas turbines at six different sites in New York City boroughs and on Long Island. The collective capacity of the units is 444 MW, which would help the transmission-constrained city meet expected summer peaks in electric power consumption.

Even diesel-electric locomotives have been used in an effort to ensure affordable and reliable power supplies. Montana Rail Link has interconnected the electrical power produce by two locomotives to the electrical grid in Butte, Mont. Early results indicated that each locomotive could provide roughly 1.5 MW of power, but that the cost of electricity produced would likely be too high to represent a viable alternative power source.

Clearly, distributed production of electrical power is experiencing tremendous growth. Concerns have been raised, however, about some of the technologies being employed in such distributed power systems. Diesel generators in particular have received negative attention, because of the harmful air emissions they produce. It is estimated that even using the lowest emission diesel generators available and employing additional pollution control devices, each generator operated by the city of Tacoma produced about the same amount of emissions every twentyfour hours as would have been produced by a diesel truck driven 6,000 miles. While the electricity was produced at a lower cost to the city, the "cost" to the environment was significantly higher than would have resulted if the same amount of power had been produced at most modern centralized electric power generating facilities. Higher emissions might be acceptable during a crisis, but small diesel generators do not represent an acceptable long-term solution.

It would therefore be desirable to provide a distributed electrical power generating system that can provide electricity in a manner that is competitive with centralized electric power generating facilities, both in cost and in regard to environmental impact considerations. Where natural gas is available and is of sufficient quality, gas-fired turbines offer a reasonable means for providing distributed electrical power generation. Advances in gas turbine technology have enabled much higher efficiencies to be achieved by gas turbines than were possible only 15 years ago. Many new centralized electric power generating facilities are based on installing multiple gas turbines, and several utilities are planning to build distributed electric power generating facilities consisting of small numbers of natural gas turbines, strategically located in urban or industrial areas of high demand. Natural gas is relatively clean burning, and minimal environmental controls are required to manage emissions produced by the combustion of natural gas. The most significant drawback to gas turbine generators is the requirement that they burn natural gas (or similar fuel gases), which is now in high demand and experiencing increases in price that are expected to worsen.

Fuel cells are another technology just entering the distributed power market. Fuel cells have long been available in small sizes for aerospace applications and are becoming available in larger sizes at significantly lower costs. Fuel cells can be characterized by the electrolytes, operating temperature, type of fuel gas, and oxidants used. Depending on the fuel cell type, mobile ions ($OH^-$, $H^+$, $O^{2-}$, or $CO_3^{2-}$) pass thru a membrane or separating matrix to combine with the fuel to produce water or $CO_2$, while electrons migrate across an external circuit, producing electricity. The chemical process that causes this current flow is exothermic, resulting in an emission stream with concomitant heat output that can be used in other processes. The gaseous fuel supplied to a fuel cell may include hydrogen, carbon monoxide, methane, and hydrocarbons. The fuel generally has restrictions on sulfur content (mainly $H_2S$), particulate loading, ammonia, halogens (e.g., HCl), and other constituents typically found in fossil fuel. Proton exchange membrane (PEM) fuel cells have high input restrictions—the fuel gas needs to consist of pure hydrogen; these fuel cell generally have very low tolerance to carbon monoxide. High-temperature fuel cell systems, such as molten carbonate fuel cells (MCFC) or solid oxide fuel cells (SOFC), can accept syngas mixtures (i.e., mixtures of hydrogen and carbon monoxide) with additional methane and hydrocarbons. $CO_2$ is generally a diluent in the fuel gas; however, it is required in small quantities in MCFCs. Oxygen needed in the electrochemical reactions of high temperature fuel cells is usually supplied in form of air, which may be dried, preheated, or oxygen-enriched. As fuel cell technologies mature, and these products reach the market in increasing quantities, they will offer an attractive means for distributed electrical power generation.

One of the most abundant and readily available fuels in the U.S. is coal, which cannot be used directly in either gas turbines or fuel cells. Furthermore, there exists a host of carbonaceous alternative fuels, such as chemical process wastes, industrial wastes, waste oils, marine diesel, and chlorinated hydrocarbons, all of which possess fuel value, but which also cannot be used directly in gas turbines or fuel cells. It would thus be desirable to provide a distributed electrical power generating system that can produce electricity, using fuels other than natural gas or diesel oil, to take advantage of the availability of such fuels.

Marine diesel is generally used on ships for co-generation of electricity and steam that is used for propulsion and on-board utilities and services. New developments in naval architecture are focused on designs that use a predominance of electrical power for all shipboard functions, with a reduction in overall emissions. In this application, modern fuel cells may play an important role. It would therefore be desirable to provide a method and apparatus capable of reforming carbonaceous fuels into a form usable by either a fuel cell or gas turbine, thus enabling distributed electrical power generating systems to use fuels other than natural gas or hydrogen, and to allow new forms of electrical power production in naval applications.

It has been recognized in the art that plasma torches can be employed to reform chemical substances into other compounds. Applications for plasma torches in the prior art have generally focused on the use of direct current (DC) arc plasma torches to process bulk solid wastes and to destroy toxic wastes. The emphasis has been on waste volume reduction and destruction efficiency. In contrast, inductively coupled plasma (ICP) torches have been used primarily in plasma spraying for surface preparation and in the production of special materials (metal oxides and carbides) in low volume.

There have been investigations into using ICP torches to provide the thermal energy required to drive chemical reactions. For example, commonly assigned U.S. Pat. No. 6,153,852 describes the use of ICP torches to produce commercially valuable materials such as carbon monoxide (CO) and synthesis gas (a mixture of hydrogen ($H_2$) and CO). While disclosing how an ICP torch can be used to generate synthesis gas from carbonaceous materials, the above-noted patent does not teach or suggest using such synthesis gas for electrical power generation, or provide any guidance on how ICP torch production of synthesis gas can be most efficiently employed to generate electrical power. It would therefore be desirable to provide a method and apparatus enabling an ICP torch to be used to reform carbonaceous fuels not suitable for use in fuel cells or gas turbines, into a fuel that can readily be employed in such device to efficiently produce electrical power, and thus, to provide an environmentally acceptable and cost-effective competitive alternative to centrally generated electrical power.

SUMMARY OF THE INVENTION

The present invention employs an ICP to heat a carbonaceous feedstock, producing a gaseous fuel that is used to generate electricity. Generally, the fuel will include hydrogen, methane, and carbon monoxide. A portion of that electricity is used to energize the ICP torch, and surplus electricity is used to meet local demand, or can be fed into a national or regional power grid. A conventional small capacity electrical generator is employed to generate electricity, so that the present invention can be used for distributed power generation.

Substantially any carbonaceous compound that is not fully oxidized can be used as a feedstock. The carbonaceous compound can be a solid, liquid, or gas. A particularly preferred carbonaceous compound is coal. Non traditional fuels, such as paint sludges and other carbonaceous waste products can be employed.

The ICP torch employs an electrical source to excite a plasma gas. The plasma gas and the carbonaceous material are introduced into a reaction vessel, and the energetic plasma reforms the carbonaceous material into simpler constituents, such as hydrogen and methane. The ICP torch requires a source of electrical power before any fuel has been generated, thus a source of electrical power is required before the fuel produced can be used by the electrical generator to produce electricity. In one embodiment, the initial electricity used to energize the ICP torch is provided by a battery. In another embodiment, the initial electricity used to energize the ICP torch is provided by a regional or national electrical power grid. In still another embodiment, the electrical generator is coupled to an alternate fuel supply, as well as being coupled to outlet of the ICP reaction vessel, so that the alternate fuel supply is used to energize the electrical generator until sufficient fuel is being produced in the ICP reaction vessel to supply fuel required by the electrical generator.

A scrubber system is preferably employed to clean the fuel before it is fed to the electrical generator. Such a scrubber system can remove acid gases, which would be produced by the gasification of high sulfur coal. Other types of scrubber systems can be beneficially employed to remove specific impurities known to be present in the carbonaceous feedstock that is employed.

An oxidizer can be introduced into the reaction vessel, along with the carbonaceous feedstock and the energetic plasma. The oxidizer, such as steam, air or oxygen, changes the reaction kinetics within the reaction vessel. One reason to introduce oxygen into the reaction vessel is to ensure that the fuel produced includes carbon monoxide. Adding oxygen into the reaction vessel will increase the amount of carbon monoxide formed.

In one embodiment, a distributed electrical power generation system in accord with the invention is coupled to a variable external load, such that the distributed electrical power generation system includes a load-based controller. The load-based controller includes a processor configured to ensure that the system generates sufficient fuel that the electrical generator can meet the demand imposed by the variable load. As the variable load increases, the load-based controller will control the ICP torch and the flow rate of the carbonaceous material such that more fuel is provided to the electrical generator by the system. When the variable load decreases, the load-based controller controls the ICP torch and the flow rate of the carbonaceous material so that less fuel is produced and provided to the electrical generator by the system, when the load is reduced.

Several different types of electrical generators can be used in accord with the present invention. Conventional internal combustion engines, configured to operate using a hydrocarbon rich gaseous fuel, can be employed as a prime mover to drive a generator to produce electricity. Or, gas turbines can be employed to burn the fuel produced in the reaction vessel to generate electricity. The fuel produced will generally include a hydrogen fraction, which can be used to power a fuel cell, and thus, the electrical generator can also be a hydrogen fuel cell. In a particularly preferred embodiment, the fuel produced in the ICP reaction vessel is scrubbed to remove any constituents that would poison a hydrogen fuel cell. For example, sulfur compounds can poison fuel cells, and such compounds need to be removed from the fuel produced in the ICP reaction vessel. Carbon monoxide, which may often be a component of the fuel produced in the ICP reaction vessel, is a poison to fuel cells operating at relatively low temperatures, such as the Proton Exchange Membrane Fuel Cell (PEMFC). While the carbon monoxide fraction could be separated from the hydrogen fraction in the fuel, rather than going through the expense of such separation, a different type of fuel cell can be employed. For example, carbon monoxide can be used directly in high-temperature fuel cells, such as the Solid Oxide Fuel Cell (SOFC), or molten carbonate fuel cell (MCFC).

In a particularly preferred embodiment of the present invention, more than one type of electrical generator is employed. For example, a fuel produced in the ICP reactor may include both hydrogen and another combustible gas. The fuel is scrubbed to remove any sulfur compounds that might poison the fuel cell, and the cleaned fuel from the scrubber is directed into a fuel cell. The exhaust from the fuel cell will still include the combustible gas, which is then directed to an electrical generator (such as an internal combustion engine or a gas turbine) to generate even more electricity. Removing sulfur compounds to prevent the fuel cell from being poisoned will also have the beneficial effect of reducing emissions when the combustible gas is burned.

Several different process enhancements can be employed to maximize the efficiency of the present invention. As noted above, oxidizers can be introduced into the reaction vessel to manipulate the mixture of gases present in the fuel being produced. The system can employ heat recovery systems, such that heat from the fuel exiting the reaction vessel, or heat from the exhaust of the electrical generator, is captured and used to heat one or more of the process materials. Compressors, powered using electrical energy produced in the system, can be used to compress the fuel before introduction into a turbine, to increase the operating efficiency of the turbine.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention uses a carbonaceous feedstock and reforms the feedstock into a fuel gas that can be used to produce electricity. This electricity can be generated in a central generating power plant, a distributed generating power plan, a power plant for remote service, or as part of ship-board power production and propulsion system. The reforming process occurs in an ICP reactor vessel. The highly reactive and high-temperature plasma produced by the ICP system reacts with the carbonaceous feedstock, reforming it into a fuel gas that generally includes hydrogen gas, methane gas, and carbon monoxide gas (among other compounds). The fuel gas is then cleaned by a gas conditioning system and fed into an electric power generating device to produce electrical power. A portion of the electrical power produced is used to enable continued operation of the ICP reactor, and the balance of the electric power can be supplied to other loads.

Figure 1:
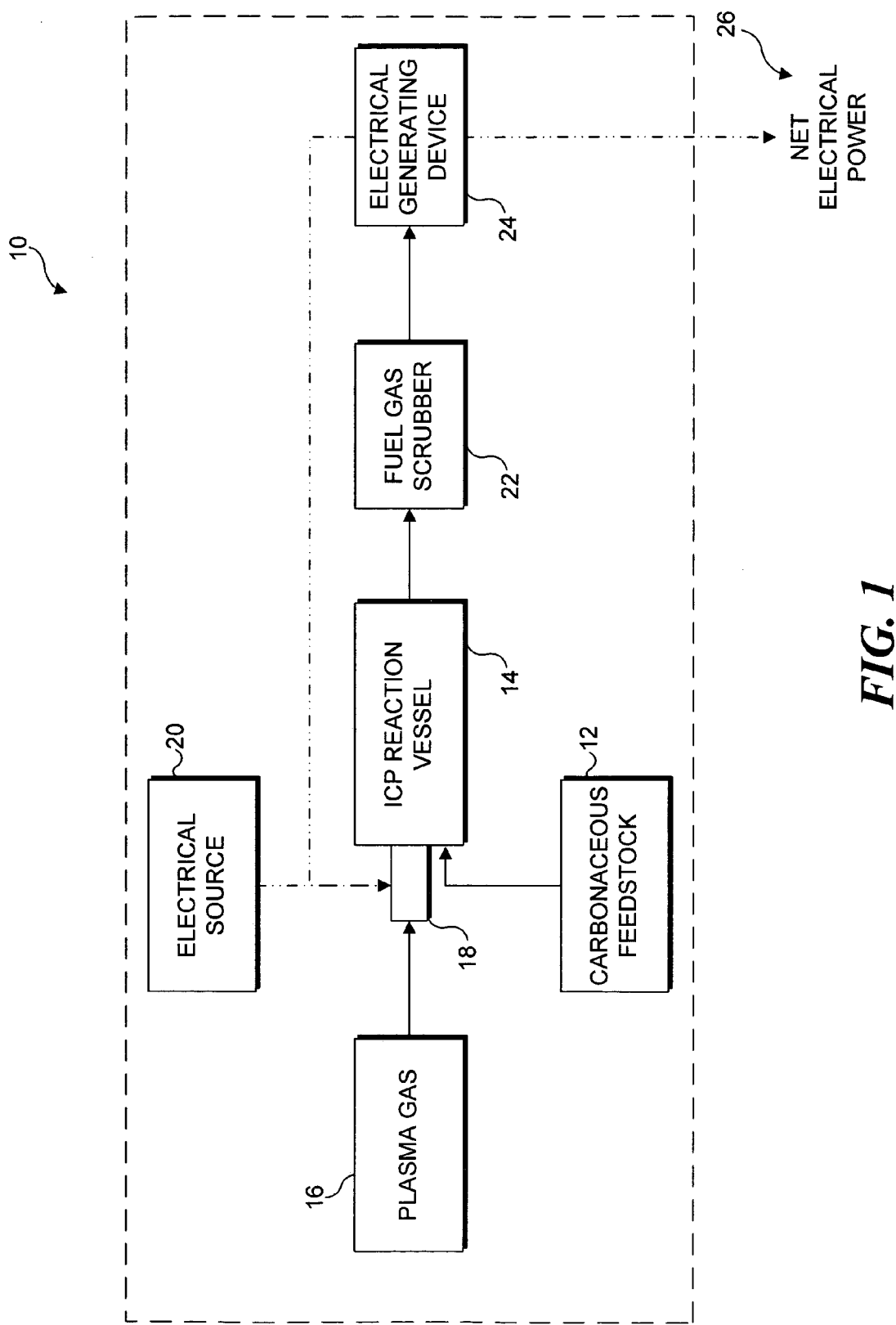
FIG. 1 is a block diagram of a simplified process flow for an ICP-based distributed power system (note that the term "ICP" is used throughout this disclosure to refer to the plasma that is generated within a device such as a ICP torch), in accord with the present invention.

FIG. 1 illustrates a simplified process diagram for the present invention. A carbonaceous feedstock 12 is injected into an ICP reaction vessel 14. Many different carbonaceous compounds are energy rich. In general, any carbonaceous compound that is not fully oxidized can be used as a fuel. For example, carbon dioxide ($CO_2$) is a fully oxidized carbon compound that has no fuel value. On the other hand, carbon monoxide (CO) is not fully oxidized and can be used as a fuel. While carbon dioxide ($CO_2$) cannot be directly used as a fuel, if introduced into the ICP reactor, the carbon dioxide can be reformed into a fuel. For example, depending upon the plasma gas and any other feedstocks that are provided, the carbon dioxide can be reformed into a carbon compound (such as CO) that can be used as a fuel to produce electricity.

A preferred carbonaceous compound that is useful as a feedstock is coal. While coal can readily be burned in centralized electrical production facilities to drive a steam turbine, coal cannot be used as is in a distributed electrical power generation system that generates electricity using either a fuel cell or a gas turbine. In the present invention, the coal entering reaction vessel 14 is ionized by the ICP and reformed into a mixture of gases that can then be used as a fuel source for a gas turbine, a fuel cell, or a combustion engine. As discussed in more detail below, the reformed gases primarily comprise hydrogen, methane, and carbon monoxide. Comparisons between fuel gas produced from coal using ICP based reforming and other technologies are included in Appendix D, which is attached hereto.

Non-ICP based coal gasification technologies are well known in the art. However, such technologies require the use of high pressure systems. While readily available, such high pressure systems represent a significant capital expense, and the present invention, which uses ICP at atmospheric pressures to reform coal into a fuel gas, provides a significant advantage over the high pressure systems required by prior art coal gasification technologies. Furthermore, it should be understood that substantially any carbonaceous feedstock, not just coal, can be reformed using the ICP system of the present invention. This advantage is in sharp contrast to the prior art, high pressure coal gasification technologies that are based on partial oxidation with pure oxygen or air, which have been specifically developed for gasification of coal. The ICP reforming process is applicable to coal, waste oils and emulsions, chlorinated hydrocarbons, marine diesel, natural gas, heavy refinery bottoms, plastics, and other carbonaceous materials. These materials can be fed into ICP reaction vessel 14 as gases, liquids, slurries, and/or particulates. A major advantage of the process used in this invention is thus its flexibility to accept a wide range and mixture of carbon containing feedstocks.

An ICP is generated in the present invention by causing a gas stream to flow through an oscillating electromagnetic field, thereby producing a current in the gas and forming a plasma jet. The plasma jet is a selected plasma gas in an ionized state and is at a very high temperature. The ICP torch used to produce the plasma gas requires a source of electrical power, a gas feed system, and an oscillator. It will be appreciated that more than one ICP torch can be used for reforming a feedstock in the present invention.

Referring to FIG. 1, a plasma gas 16 is introduced into the electromagnetic field of ICP torch 18. A preferred plasma gas will likely be steam; however, carbon dioxide, hydrocarbons, oxygen, argon, and mixtures of these gases can also be employed as plasma gases. ICP torch 18 is energized from an electrical source 20. Electrical source 20 can be provided by an electrical storage battery, a fuel cell energy plant, or a conventional line voltage source. Preferably, the ICP system is optimized for efficiency. Commonly assigned U.S. Pat. No. 6,153,852, the drawings and specification of which are specifically incorporated herein by reference, discloses a method and apparatus for optimizing the efficiency of an ICP torch.

The hot ionized plasma gas enters reaction vessel 14, where it serves as a catalyst (due to its reactive nature) and as the heat source (due to its high temperature) for the endothermic reactions with carbonaceous feedstock 12 that produce the fuel gas. Within reaction vessel 14, the carbonaceous feedstock is disassociated by pyrolysis into smaller compounds and ions, which then reform into a plurality of different gaseous compounds (at the temperatures within the reaction vessel, thermodynamics generally favor the formation of gaseous compounds, regardless of whether the feedstock is a solid, liquid, or gas). As noted above, and as discussed in further detail below, based on a carbonaceous feedstock, this mixture of gases generally includes hydrogen, methane, and carbon monoxide and can be used as a fuel to produce electricity. It is important to understand that the fuel gas itself is more easily converted into electricity, using generating technologies such as fuel cells, gas turbine generators, and combustion engine driven generators, than coal is in conventional power plants.

The reaction vessel is preferably refractory lined or otherwise fabricated so that it is able to withstand relatively high temperatures. Multiple walls may be included, along with a cooling mechanism for heat recovery, and the system may also include heat exchangers for high pressure/high temperature steam production, or other heat recovery capability. The reaction vessel can include one or more chambers, can be vertically or horizontally oriented, and can have internal components, such as baffles, to promote back mixing and turbulence. In various embodiments, the reaction vessel is a fixed bed, a fluidized bed, or an entrained flow reactor. Multiple ports can be included to mount more than one ICP torch on the reaction vessel, with options for axial, radial, tangential or other promoted flow direction for the plasma gas, with plasma torches providing upward or downward gas flow. One or more feed ports can be incorporated to allow concurrent, countercurrent, radial, tangential, or other feed flow directions. Preferably, the feed flow is located in close proximity to the plasma jet. One or more ports can be included to allow measurements of process temperatures, pressures, and other conditions of interest. The reaction vessel can include a slag/ash removal system to remove metals, slag, and ash. Specific embodiments of reaction vessels usable in the present invention are described in more detail below.

The temperature of the process gas exiting the reactor will range from about 400 degrees Celsius to over 1000 degrees Celsius. The temperature may be reduced by a heat exchange system used to recover heat and cool the process gas. Ideally, surplus heat that is recovered will be used for space heating and/or cooling, product manufacturing, agricultural applications, etc. It is contemplated that ICP based power generating systems can be used in distributed power applications of between about 0.5 and 40 MW. The integrated ICP based reforming process system can be scaled-up to produce power at any level that proves economical.

Depending on the feedstock that is employed, it is likely that one of the components of the fuel gas will be acid gases, such as hydrogen chloride and hydrogen sulfide, which preferably are removed before the fuel gas is used to produce electricity. A gas conditioning system 22 (such as a scrubber) represents conventional gas cleaning technology that can be used in the present invention to remove acid gases from a mixed gas stream. The conditioned fuel gas is directed to an electric power generating device 24, which is capable of converting the fuel gas into electrical power. The conditioned fuel gases can be used to energize a fuel cell, which converts hydrogen and/or carbon monoxide (from fuel gas) and oxygen from ambient air into electricity and water. Methane gas can be reformed in the ICP reactor to hydrogen and carbon monoxide. The fuel gas can also be used to energize a turbine or combustion engine that serves as a prime mover for a generator to produce electric power, rather than powering a fuel cell.

The gases exiting the electric power generating devices may contain un-reacted fuel gases. Such gases can be burned within a gas turbine or a combustion engine to drive a generator to produce electrical power. A portion of the electricity produced is diverted to provide a continuing source of power to energize ICP torch 18. Depending on the specific configuration of the system, the feedstock utilized, and the specific technology employed to generate the electrical power using the fuel gas, it is contemplated that from 50 to 85 percent of the electrical power generated by electric power generating device 24 will be available as a source of electrical power supplied to other loads.

Figure 2:
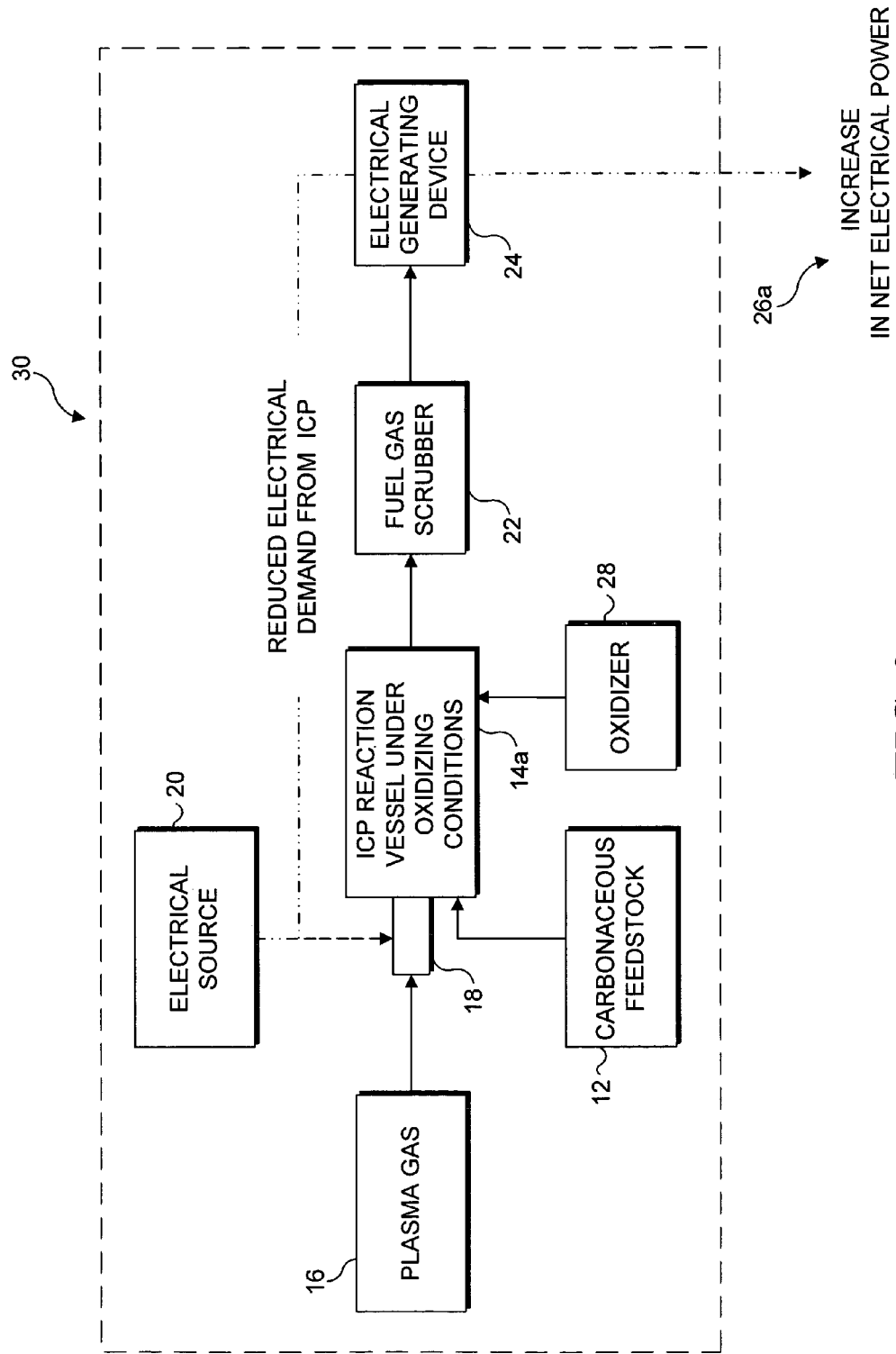
FIG. 2 is a block diagram of a simplified process flow for a different embodiment of an ICP-based distributed power system, in which the introduction of an oxidizer into the ICP reaction vessel results in a net increase in the production of electrical power.

FIG. 2 illustrates an alternate, enhanced ICP based electric power generating system 30. System 30 is expected to provide an increase in the net electrical power available to a user. This increase in the available or net production of electrical power is provided by the injection of an oxidizer 28 into an ICP reaction vessel 14*a*. Structurally, reaction vessel 14 from FIG. 1 and reaction vessel 14*a* of FIG. 2 are similar. The difference in their operation is in the introduction of oxidizer 28 into reaction vessel 14*a*, so that partial oxidation conditions exist within reaction vessel 14*a*, which do not exist in reaction vessel 14. By establishing partial oxidation conditions in reaction vessel 14*a*, the electricity required from electrical supply 20*a* (or diverted from electric power generating device 24) to energize ICP torch 18 is reduced. It is important to understand that the reforming of carbonaceous feedstock into fuel gas within the reaction vessel is an endothermic reaction. That is, energy needs to be provided to the reactants to enable them to reform into the desired fuel gas product. In system 10, all of the required energy is provided by the ionized plasma gas. In system 30, some of the energy is provided by the oxidation of a portion of the fuel gas or carbonaceous feedstock within reaction vessel 14*a*. Such oxidation liberates thermal energy, reducing the amount of energy that needs to be introduced into the reaction vessel by the plasma gas. In turn, this increased energy reduces the amount of electrical power that is consumed by ICP torch 18 to produce the desired reaction conditions within reaction vessel 14*a*. Thus, a greater proportion of the electricity produced by converting the fuel gas to electrical power in electric power generating device 24 can be provided to a user or exported as electrical power 26*a*, because ICP torch 18 requires less electricity from electric power generating device 24 in system 30 than in system 10.

While it is true that less fuel gas will be produced within ICP torch 18 to generate the desired reaction conditions (because some of the fuel gas or carbonaceous feedstock is oxidized to liberate thermal energy, and thus, less fuel gas is available to electric power generating device 24), the reduction in electrical consumption by ICP torch 18 more than offsets such loss.

Pure oxygen represents a preferred oxidizer 28. It is contemplated that air can also be used as an oxidizer, because air contains approximately 21 percent oxygen by volume. It is also contemplated that oxygen-enriched air can be used as an oxidizer. A detailed analysis of the effects that partial oxidation conditions are expected to have on the fuel gas product in an ICP-based reforming system is included in Appendix C, which is attached hereto.

It is expected that in some circumstances, it will be desirable to reduce the amount of electric power generated by an ICP-based electrical power generating system, to maximize production of heat. For example, in a combined heat and power application where the need for process heat is emphasized, the partial oxidation embodiment will not be preferred, because such an embodiment reduces the amount of fuel gas that will be generated, which can be combusted to generate the desired heat. The ICP based reforming and electric power generating systems of the present invention can thus be easily optimized to provide maximum heat, or maximum electric power. Note also that it is anticipated that an overall maximum economical benefit may be achieved at some point between pure ICP reforming (maximum heat) and pure partial oxidation (maximum electric power). Such an optimal process point will depend on case-specific inputs including feed composition, location, integration with associated facilities, use of process heat and steam in combined heat and power applications, and expenses related to the supply of the oxidizer.

Figure 3:
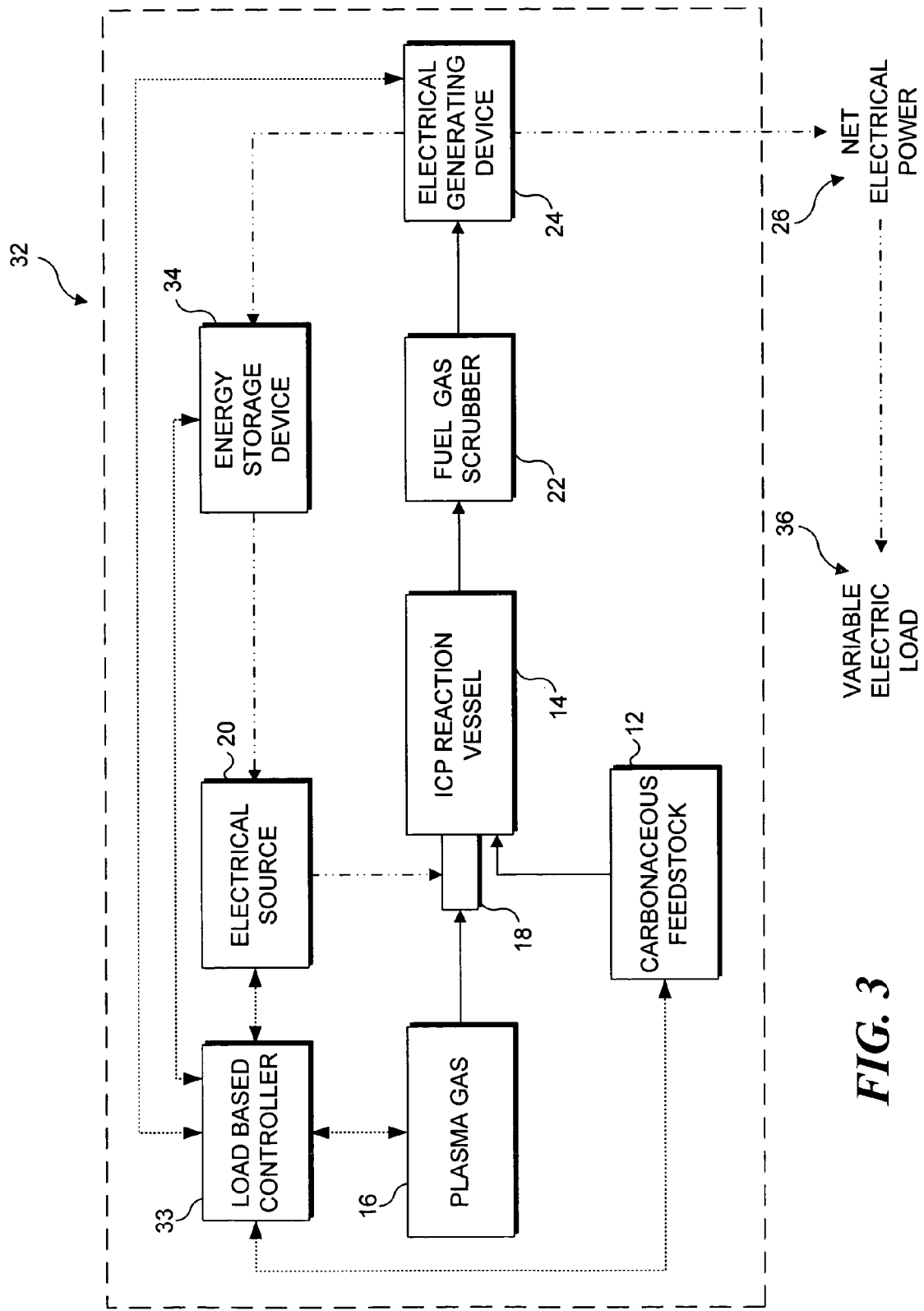
FIG. 3 is a block diagram of a simplified process flow for yet another embodiment of an ICP-based distributed power system, which incorporates an energy storage device to enable the system to balance loads, to provide additional electrical power at times of peak demand, and to provide very rapid load-following capabilities.

FIG. 3 illustrates yet another embodiment of an ICP-based distributed electric power generating system 32. System 32 includes load-following components that enable system 32 to supply net electrical power 26 to a variable electric load 36. System 32 can be managed to integrate fuel gas production and power production at base load conditions, and to rely on an electrical energy storage device (e.g., a flywheel, capacitor storage banks, pumped storage, or various configurations of batteries) to supply standby power for demand transient and system upset conditions. The system can be designed to increase or decrease fuel gas production rates and power generation output to respond to a shift of the base load power demand. Preferably, such a load following system will enable optimization of the reforming process control system to respond to changes in power demand from the electrical supply grid with other system attributes, such as overall system efficiencies.

Thus, system 32 includes an energy storage device 34. Under normal distributed power conditions, normal electrical utility grid power is available as standby power. This standby power from the electrical utility grid is used to start up the ICP reforming process, and to "charge" or "energize" the energy storage device. Once fuel gas begins to exit reaction vessel 14 and is provided to electric power generating device 24, electrical power is produced. A portion of that electrical power is exported for use by other loads as net electrical power 26, and a portion is provided to ICP torch 18 to supply the electricity that is required to energize the ICP torch. A load-based controller 33 monitors variable electric load 36. When electric power generating device 24 is producing more net electrical power than is required by variable electric load 36, load-based controller 33 causes some of the electrical power produced by electric power generating device 24 to be diverted to energy storage device 34. When variable electric load 36 requires more electricity than electric power generating device 24 can provide as net electrical power, and still maintain sufficient electrical power to energize ICP torch 18, the additional electrical energy is provided by energy storage device 34. This configuration enables system 32 to provide additional electricity that is exported as net electrical power to variable electric load 36, for as long as it takes energy storage device 34 to become fully discharged.

A long-duration discharge would indicate an increase in the base load conditions, causing controller 33 to increase the flow rates of plasma gas 16 and carbonaceous feedstock 12, to increase the amount of fuel gas being produced, and to increase the amount of power produced from electric power generating device 24. In times of steady-state demand or in low demand, excess electrical current is once again returned to energy storage device 34, until the energy storage device is fully recharged. When energy storage device 34 is fully energized, and the base electrical load demand is met, controller 33 reduces the flow rates of plasma gas 16 and carbonaceous feedstock 12, to reduce the amount of fuel gas being produced to match the load demand. While not shown, it should be understood that oxidizer 28 as described in connection with FIG. 2, could be incorporated into system 32 to achieve greater efficiency.

While a controller is shown only in connection with FIG. 3, it will be understood that a process control system can be included in any embodiment to monitor process conditions, such as temperatures and pressures, throughout the system. Such a control system can be employed to adjust feedstock feed rates, plasma gas feed rates, supplementary process gas feed rates, and ICP torch power levels. A fuel gas analysis subsystem can be included to provide additional feedback to such a controller.

FIGS. 1, 2, and 3 illustrate simplified flow process diagrams describing these basic preferred embodiments of the present invention. The process diagrams of FIGS. 4-10, which are described below, are considerably more detailed and provide additional information relative to the preferred embodiments of specific subsystems, such as electric power generating device 24.

Figure 4:
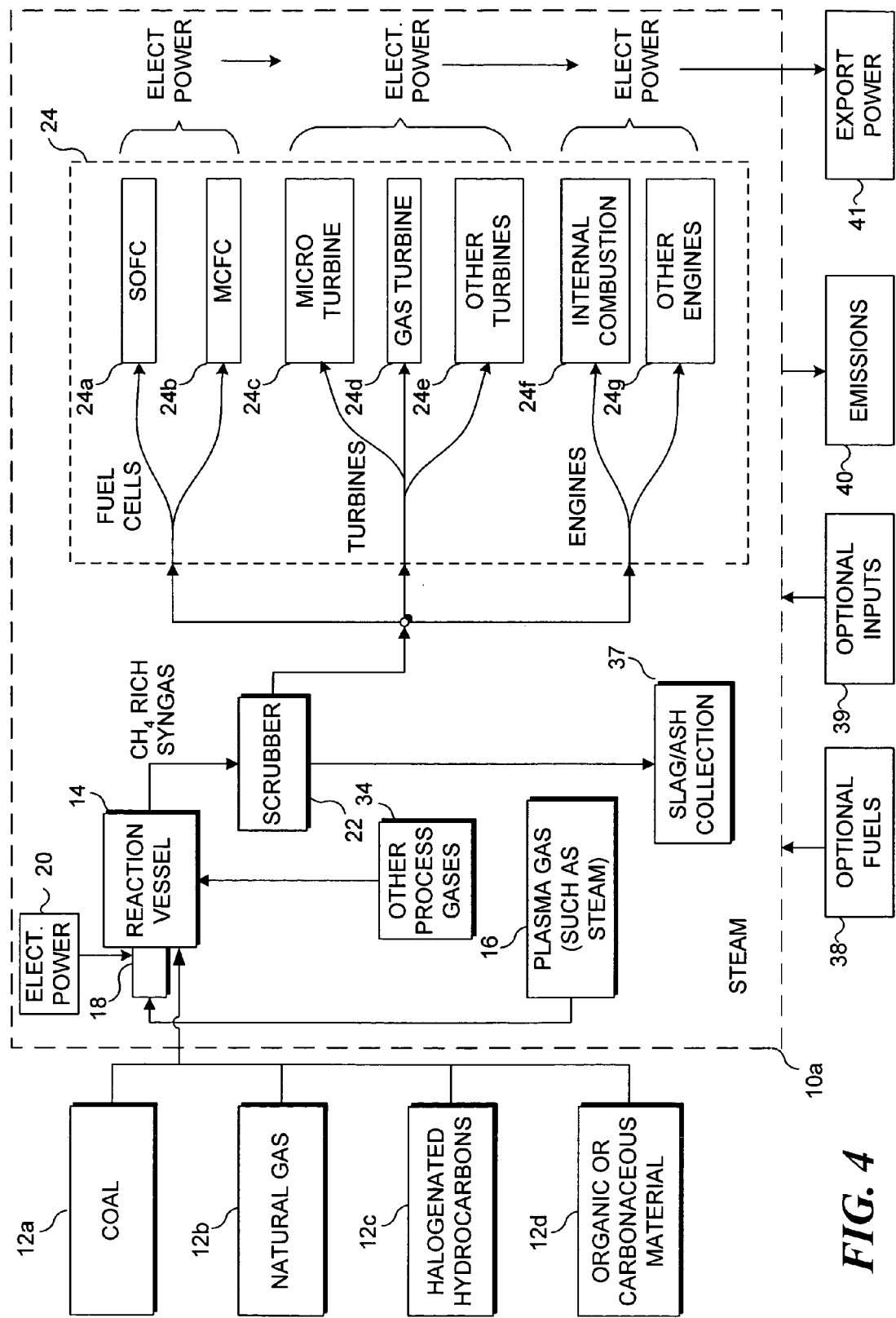
FIG. 4 is a process flow diagram for an ICP-based distributed power system in accord with the present invention, illustrating a plurality of different feedstock options, and a plurality of different electrical energy production systems that can be employed to use the ICP reformed feedstock as a fuel to generate electricity.

Referring now to FIG. 4, a system 10a is generally similar to system 10 of FIG. 1; however, FIG. 4 provides additional detail with respect to different carbonaceous compounds that can be employed as a fuel to be reformed in the ICP reaction vessel, as well as different types of electrical generators that can be used to convert the reformed fuel gas into electrical power. One of the advantages the ICP reforming process of the present invention has over other types of distributed electrical production systems is the ability to use any of a wide variety of different fuels. For example, some fuel cells require hydrogen rich fuel gas to produce electricity. A gas turbine requires a hydrocarbon rich fuel gas, and high heating value hydrocarbon solids or sludges cannot be used. In contrast, the distributed power systems of the present invention can use solid, gaseous, or liquid hydrocarbons, all of which are reformed into a fuel gas in reaction vessel 14. FIG. 4 clearly illustrates potential feedstock options, wherein coal 12a, natural gas 12b (to be reformed into a hydrogen containing fuel gas for use in fuel cells), chlorinated hydrocarbons 12c, or other organic or carbonaceous materials 12d can alternatively be used.

The introduction of additional process gases such as carbon dioxide and other hydrocarbon gases can affect the quality of the fuel gas produced, as a function of the carbonaceous feed that is supplied to the reaction vessel. Those of ordinary skill in the art of chemical processing will easily be able to determine that additional process gases can enhance the quality of the fuel gas being produced, given a specific carbonaceous feed. Such additional process gases are directed into reaction vessel 14 via an additional process gas feed 34. Particularly when a solid hydrocarbon fuel is being reformed in reaction vessel 14, it is contemplated that a significant amount of ash will be generated. System 10a therefore includes a slag or ash collection system 37.

System 10*a* also illustrates the wide variety of different types of electric power generating devices 24 that can be employed to produce electrical power from the fuel gas. These different types of generators include solid oxide fuel cells (SOFCs) 24*a*, molten carbonate fuel cells (MCFCs) 24*b*, micro turbines 24*c*, gas turbines 24*d*, other types of turbines 24*e*, internal combustion engines 24*f* (including Stirling engines), and other engine types 24*g*.

Molten carbonate fuel cells (MCFC) contain an electrolyte that is a combination of alkali (Li, Na, and K) carbonates stabilized in a $LiAlO_2$ ceramic matrix. The gaseous input fuel mixture can include carbon monoxide, hydrogen, methane, and hydrocarbons, with limits on total hydrocarbons, particulate loading, sulfur (in the form of $H_2S$), ammonia, and halogens (e.g., HCl). At the operating temperature of about 1200° F. (650° C.), the salt mixture is liquid and a good ionic conductor. The anode process involves a reaction between hydrogen and carbonate ions ($CO_3^-$) from the electrolyte, which produces water and carbon dioxide ($CO_2$), while releasing electrons to the anode. The cathode process combines oxygen and $CO_2$ from the oxidant stream with electrons from the cathode to produce carbonate ions, which enter the electrolyte. If the $CO_2$ content in the fuel gas is insufficient, $CO_2$ can be recycled from the emission stream. An MCFC produces excess heat at a temperature, which is sufficiently high to be usable in producing high pressure steam that may be fed to a turbine to generate additional electricity. In combined cycle operation (steam turbine powered generation and fuel cell power generation), electrical efficiencies in excess of 60% are predicted for mature MCFC systems.

A solid oxide fuel cell (SOFC) uses a hard ceramic electrolyte instead of a liquid and operates at temperatures up to 1,000° C. (about 1,800° F.). In this type of fuel cell, a mixture of zirconium oxide and calcium oxide forms a crystal lattice, although other oxide combinations have also been used as electrolytes. The solid electrolyte is coated on both sides with specialized porous electrode materials. At a relatively high operating temperature, oxygen ions (with a negative charge) migrate through the crystal lattice. The fuel gas containing hydrogen and carbon monoxide is passed over the anode while a flow of negatively charged oxygen ions moves across the electrolyte to oxidize the fuel. The oxygen is supplied, usually from air, at the cathode. Electrons generated at the anode travel through an external load to the cathode, completing the circuit that carries the electrical current. Generating efficiencies can range up to about 60 percent. Like molten carbonate fuel cells, solid oxide cells require high operating temperatures that provide the opportunity for "co-generation"—i.e., a combined heat and power application using waste heat to generate steam for space heating and cooling, industrial processing, or for use in driving a steam turbine to generate more electricity.

The major difference between micro turbine 24*c* and traditional gas turbine 24*d* are size and efficiency of operation. While there is no distinct power level that separates a micro turbine from a gas turbine, it should be understood that micro turbines are relatively small and generally are designed to produce from as little as 30 kilowatts up to as much as about a megawatt of electricity. On the other hand, small gas turbines generally are significantly larger units, and typically generate up to 10-12 MW of electricity each. Medium gas turbines typically generate 20-100 MW, while large gas turbines can generate several hundred MW. Centralized power plants often install multiple gas turbines within a single facility to provide hundreds of megawatts of electrical power. As interest in developing a distributed electric power generating market continues to grow, it is expected that hybrid turbines and other types of turbines will continue to be developed, as indicated by the use of the term "other turbines" 24*e*.

The use of internal combustion engines to generate electricity, particularly in the context of distributed electric power generating systems, represents an already mature technology. Although diesel engines have captured the majority of this market, other types of internal combustion engines can be readily adapted to run on the fuel gas produced by the ICP reforming of carbonaceous materials.

While internal combustion engines are commonly used to drive generators to produce electrical power, it should be noted that other types of engines can also be used to generate useful amounts of electrical power with the fuel gas produced in reactor 14. One example of other engine types 24*g* is the Stirling heat engine. The Stirling heat engine is an external combustion engine. External combustion has the advantage of being able to achieve cleaner combustion, with fewer hazardous byproducts, than internal combustion engines. Thus, external combustion engines generally require fewer pollution control devices than do internal combustion engines to achieve the same exhaust quality. Stirling engines have been known since 1816, but have not been extensively used. However, recent work involving an acoustical Stirling heat engine at Los Alamos National Laboratory has sparked renewed interest in Stirling engines and in their potential for the distributed production of electrical power (preferably in settings where co-generation capabilities are employed).

Depending on the specific electric power generating device selected, it may be beneficial to include other types of fuel, in addition to the fuel gas generated in reaction vessel 14, to maximize the efficiency of the electrical generator. Such additional fuels, indicated by optional fuels 38, can include natural gas, oil, and other conventional hydrocarbon-based fuels. It should be noted that the optional fuels are not intended to provide the majority of the BTUs or energy consumed by the electrical generators, but instead are included only when they can enhance the overall efficiency of the system.

FIG. 4 also illustrates the types of emissions 40 that can be produced using system 10*a* to generate distributed electrical power 41. Such emissions are expected to include carbon dioxide, steam, low amounts of nitrogen oxides ($NO_x$), small amounts of sulfur dioxide ($SO_2$), air, nitrogen, sulfur (in the form of sulfuric acid generated by gas conditioning system 22), and ash or slag.

Figure 5:
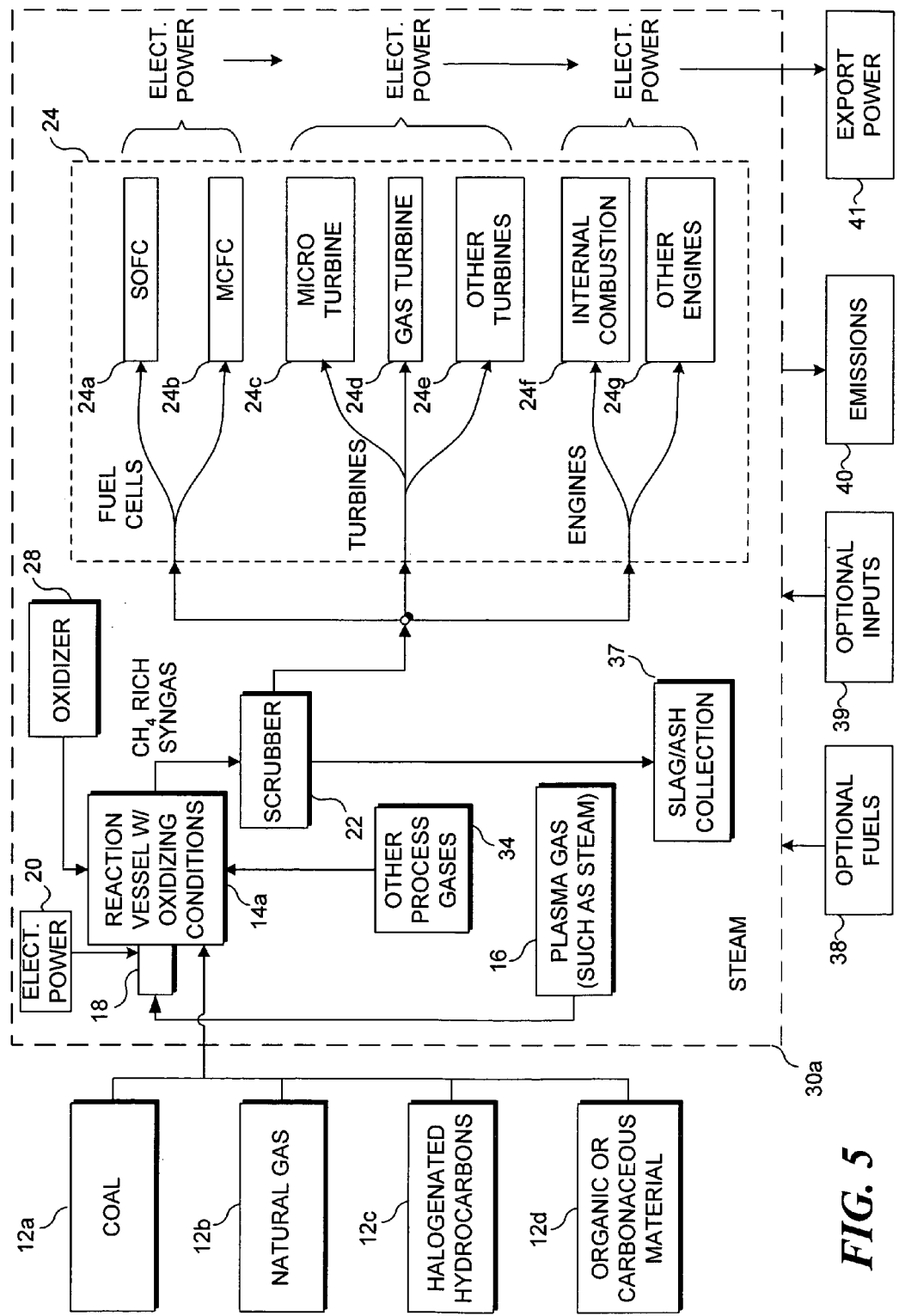
FIG. 5 is a process flow diagram very similar to that of FIG. 4, differing in the incorporation of systems enabling partial oxidation conditions to exist within the ICP reactor, thereby enhancing an overall efficiency of the ICP-based distributed power system.

FIG. 5 shows an ICP-based distributed electric power generating system 30*a*, which incorporates oxidizer 28 to establish a partial oxidation environment within reaction vessel 14*a*. As described above, the partial oxidation environment within the reaction vessel 14*a* consumes some of the fuel gas produced in the reforming process (or some of the carbonaceous feedstock), to reduce the electrical power requirements to continually operate the ICP torch. Accordingly, more of the fuel gas produced can be used to generate electricity to be exported, rather than be diverted to energize the ICP torch. The partial oxidation reaction itself is relatively well known. However, when used in other industrial processes, oxidation reactions are generally performed under extremely high pressures, which require that a high pressure reaction vessel be used, as well as expensive subsystems that can pressurize the reaction vessel to achieve the required pressure. Such expensive systems are not required in system 30*a*, because the reactor is designed to operate at, or near, atmospheric pressure.

Figure 6:
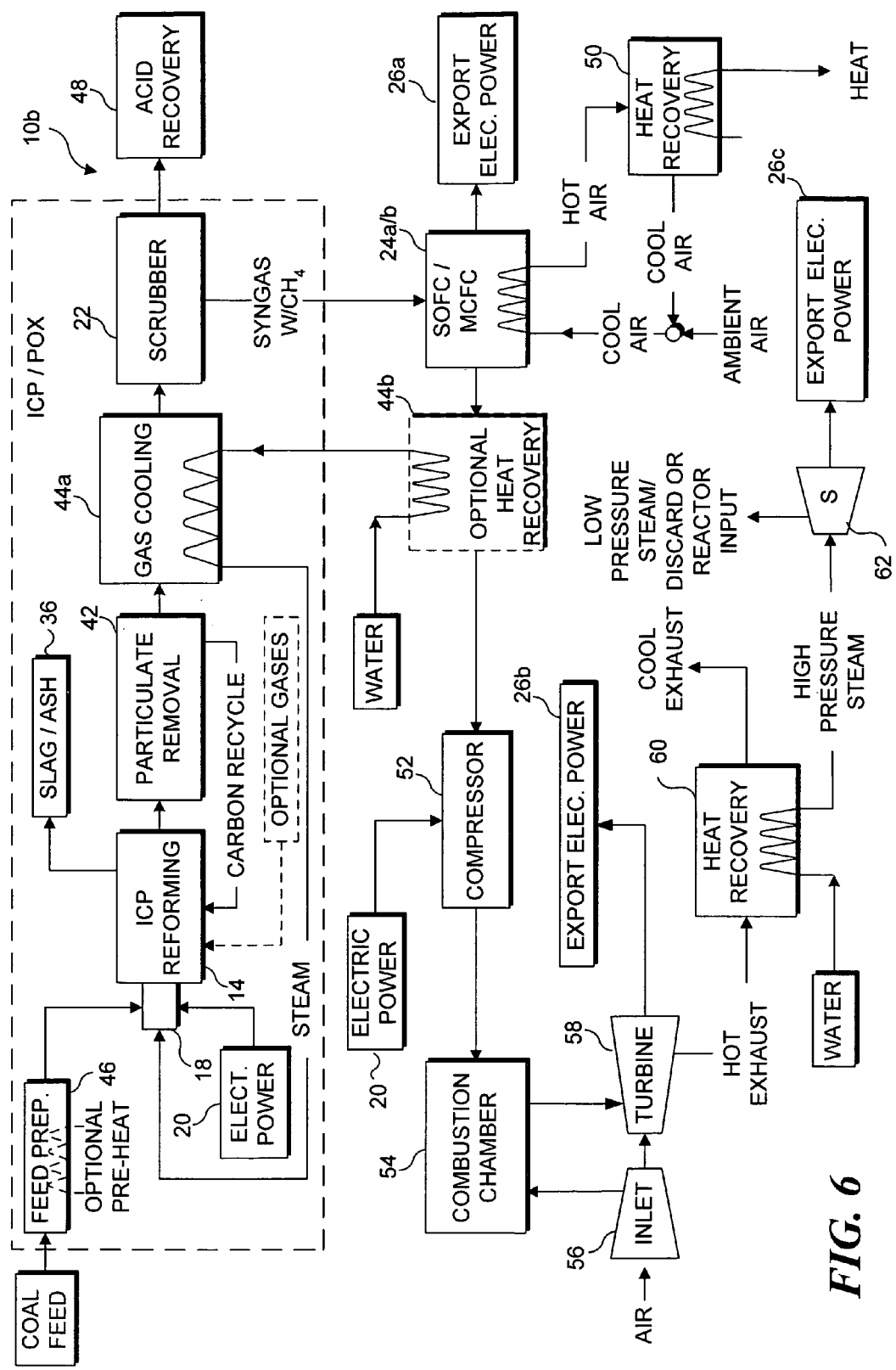
FIG. 6 is a detailed process flow diagram for an ICP-based distributed power system, in which a fuel cell is used to generate electrical power.

FIG. 6 illustrates an ICP-based distributed electric power generating system that includes a plurality of additional subsystems designed to enhance the efficiency of the system, to maximize the amount of net electrical energy that can be produced. Particularly when coal is used as a feedstock, a feed preparation subsystem 46 will need to be included. When processing coal, feed preparation subsystem 46 will pulverize coal into small coal particles that can be introduced into ICP reforming reaction vessel 14. This processing will ensure that the majority of the coal will be ionized and reformed into valuable fuel gas, rather than passing through the reactor in an unreformed state and exiting the reaction vessel to be collected in slag and ash collection system 37.

A particulate removal system 42 has been incorporated to remove particulates that may become entrained in the fuel gas exiting reactor 14. Particularly when coal is being used as a feedstock, such a particulate removal system is expected to be beneficial. Particulate removal systems are widely available, and may include, for example, high-temperature (ceramic) filters or cyclone separators. A heat exchanger 44a is used to cool the fuel gas exiting reaction vessel 14. Depending on the specific particulate removal system employed, it may be desirable to cool the fuel gas exiting the reactor before it enters the particulate removal system. The cooling of the fuel gas may be of particular importance if a bag type filter is used for particulate removal, because bag type filters are often cellulose or organic polymer-based, and cannot withstand extremely high temperatures. An acid recovery subsystem 48 is coupled to gas conditioning system 22, to recover sulfuric acid (from high sulfur coal) and hydrochloric acid (from chlorinated hydrocarbons), which may have a marketable value. The acid removal system may include scrubber systems, acid removal systems, and other conventional equipment related to sulfur and/or acid removal systems.

While not shown, it should be understood that demisters/reheaters could be incorporated for moisture removal and/or prevention of condensation. Heat exchangers can be included to reheat the fuel gas to the inlet temperature required by the downstream power generation equipment. A compressor can also optionally be included to compress the fuel gas to the inlet pressures required by downstream power generation equipment.

System 10b preferably employs either a solid oxide fuel cell 24a or a molten carbonate fuel cell 24b. The fuel cell will produce electrical power 26a, at least a portion of which is diverted to ICP torch 18 to continually energize the ICP torch, and will supply power to other electrical loads required in the gasification process, the remainder being exported as net electrical power. A heat exchanger 50 is employed to recover any usable heat from fuel cell 24a or 24b. The heat recovered from heat exchanger 50 can be used to produce steam, for use as an additional process gas, for use as the plasma gas, or for other purposes, such as providing heat to the facility in which system 10b is installed. If steam can be produced at a sufficiently high pressure, the steam can be used to drive a steam turbine and generator to generate additional electrical power.

The (high-temperature) fuel cell will consume the hydrogen and (primarily in SOFCs) some carbon monoxide from the fuel gas produced in reaction vessel 14. Methane contained in the fuel gas is partially reformed in the high-temperature fuel cell, resulting again in hydrogen and carbon monoxide. However, a fraction of the fuel gas is not converted to steam and carbon dioxide. Thus, the gas mixture exiting the fuel cell will likely still include useful quantities of methane and carbon monoxide gases. These hot gases are directed to a heat exchanger 44b, which in cooperation with heat exchanger 44a, are used for the production of steam that is used in the reaction vessel 14. The cooled residual gas is then directed into a compressor 52, which is energized by electrical power provided either by the fuel cell or electrical supply 20. Compressor 52 will be consuming some electrical power that could otherwise be exported. However, compressor 52 actually enhances the overall efficiency of system 10b, because the compressed residual gas can be directed into a combustion chamber 54. In combination with an air inlet 56 and a gas turbine 58, the residual gas is oxidized to generate additional electrical power for export, as indicated by a block 26b. The hot gases exiting turbine 58 pass through a heat exchanger 60. It is contemplated that the exhaust gases can then be used to drive a steam turbine to generate additional electrical power, as indicated by a block 26c. As an alternative to steam turbine 62, other systems can be employed to turn waste heat into useable electrical energy. One such system uses the Rankine cycle.

To summarize system 10b, fuel cells 24a/24b, gas turbine 58 and steam turbine 62 are used to produce electricity. Electricity is consumed by ICP torch 18 and compressor 52. Empirical calculations have shown that these additional subsystems will enable the net electrical power produced by the system to be increased, compared to the simpler system illustrated in FIG. 1.

Figure 7:
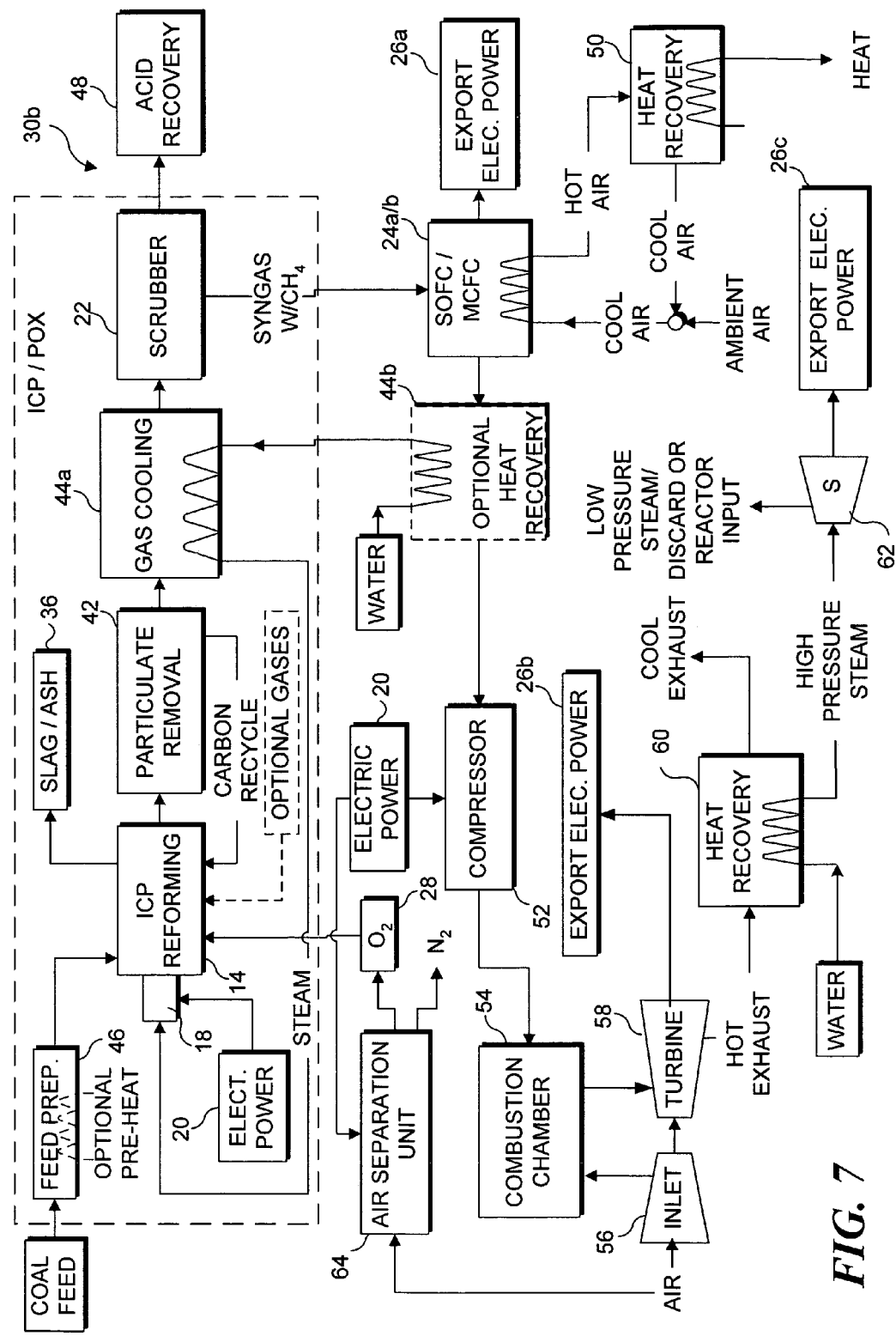
FIG. 7 is similar to the process flow diagram of FIG. 6, differing in the incorporation of systems that enable partial oxidation conditions to exist within the ICP reactor, thereby enhancing an overall efficiency of the ICP-based distributed power system.

FIG. 7 illustrates an even more efficient system 30b. System 30b is generally similar to system 10b; however, oxidizer 28 is injected into reaction vessel 14a to establish partial oxidation conditions within the reaction vessel. As noted above, such oxidation conditions within reaction vessel 14 reduce the amount of electrical power consumed by ICP torch 18, thereby enabling a larger percentage of the electrical power that is produced by fuel cell 24a/24b, turbine 58, and steam turbine 62 to be exported to other loads. The preferred oxidizer for system 30b is pure oxygen, which is provided by an air separator unit 64. While the air separator unit itself will consume some of the electrical power produced by system 30b, the use of pure oxygen is expected to reduce the amount of electrical power consumed by ICP torch 18 to a greater extent than the use of ambient air, because pure oxygen is a much more effective oxidizer than ambient air. Thus, the electrical power consumed by air separator 64 is more than offset by the reduced power requirements of ICP torch 18 resulting from the use of pure oxygen instead of ambient air for oxidizer 28.

Figure 8:
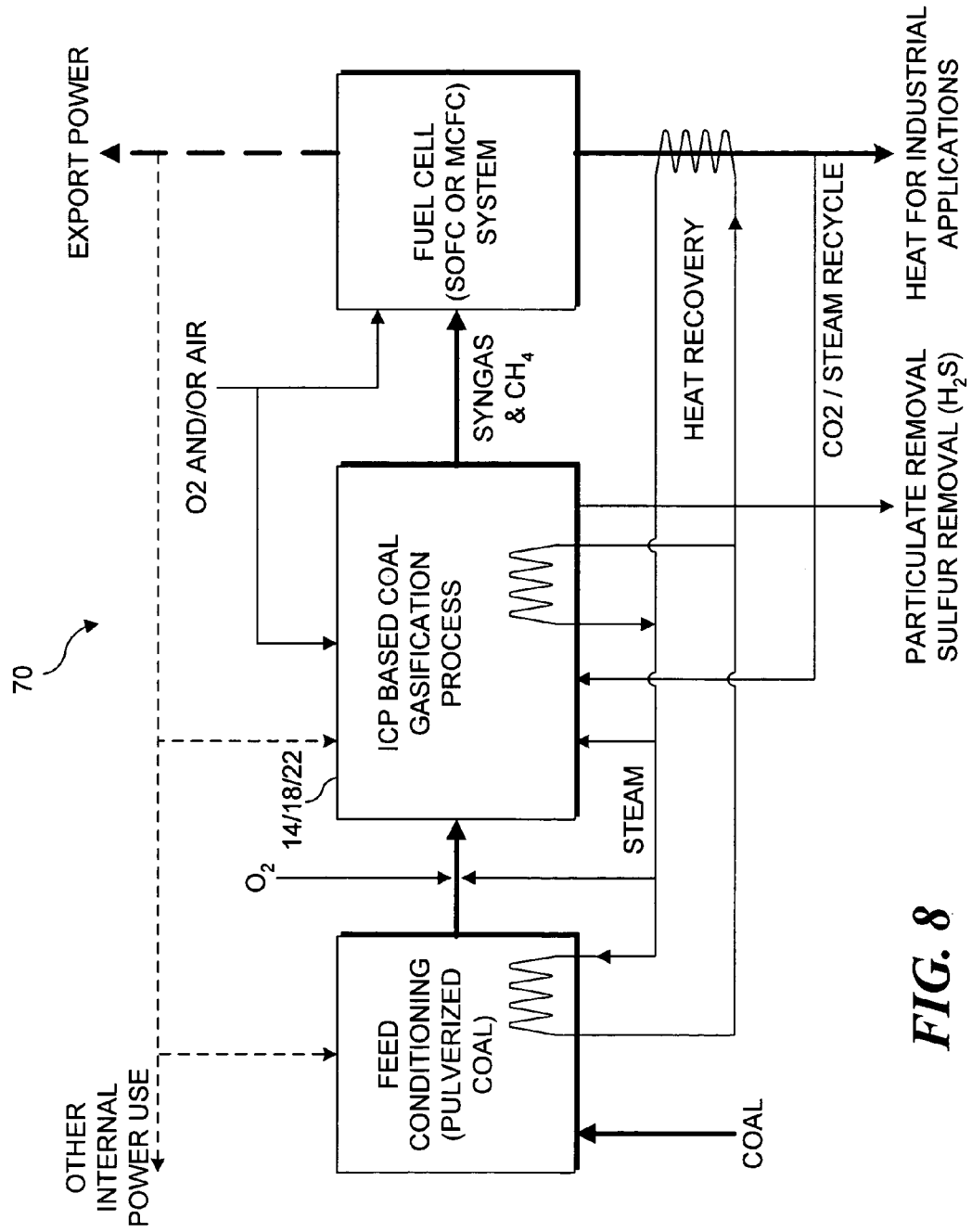
FIG. 8 is a process flow diagram showing a preferred ICP-based distributed power system for coal gasification, referred to as the "Nuvotec Gasification Process," incorporating systems enabling partial oxidation conditions to exist within the ICP reactor, and waste heat recovery systems, thereby enhancing an overall efficiency of the ICP-based distributed power system.

While the previous figures have illustrated the flexibility of the present invention, FIG. 8 focuses on what is likely to be one of the most useful embodiments of the present invention. FIG. 8 illustrates a process diagram for an ICP-based distributed electric power generating system 70 that employs coal as the preferred feedstock, incorporates the partial oxidation system described above to reduce the energy requirements of the ICP torch, and uses the fuel gas produced to energize a fuel cell. The integration of the ICP based coal reforming technology with high temperature fuel cell systems will combine the benefits of both technologies for distributed power production. Such an integrated system is expected to exceed overall power production efficiencies of traditional coal-fired plants, and to match the environmental friendly performance of large scale coal gasification plants. A detailed analysis of the constituents in an ICP reformed coal based fuel gas is provided in Appendix A, which is attached hereto. Calculations showing expected Mass/Energy balances believed achievable in a coal-based ICP reforming system using a SOFC to produce electrical power, under various feed conditions, are included in Appendix B, which is also attached to this disclosure.

The integration of a system for gasification of coal with advanced fuel cell technology requires a flexible, robust, and continuously operating reforming system that is applicable to various coal fuel qualities. ICP reforming systems offer the potential to accept a wide variety of coal feeds, including coal with high sulfur content. The incorporation of partial oxidation conditions within the reaction vessel is expected to provide the best gasification configuration, by optimizing the fuel gas composition, while minimizing energy requirements in the ICP reaction vessel.

Referring to FIG. 8, coal is gasified in the "NUVOTEC™ Coal Gasification Process." Bulk coal is prepared (pulverized) in a feed preparation system. The pulverized coal is fed into the high temperature plasma zone of reaction vessel 14. The endothermic gasification of coal is initiated in the plasma zone of the ICP torch by the energy and reactivity of the plasma gas. Preferred plasma gases include steam, carbon dioxide, or oxygen (or mixtures thereof). The gasification reactions are completed in reaction vessel 14. Additional process gases, such as steam, carbon dioxide, and/or hydrocarbons, can be blended in the reaction vessel 14 to optimize the coal gasification reaction chemistry. As noted above, feeding oxygen or air into the reaction vessel creates partial oxidation conditions within the reaction vessel. These partial oxidation conditions reduce the energy requirement in the gasification system, compared with a pure endothermic reaction based on using the ICP torch alone to provide the thermal energy. This enhanced efficiency results in an increase in the overall surplus electrical energy production. At the same time, the process enables the system to produce the optimal fuel composition for the downstream fuel cell. The fuel gas produced includes entrained particulates, hydrogen sulfide, and small amounts of carbonyl sulfide and ammonia, which are removed in conventional gas conditioning systems. The clean fuel gas is then introduced into the fuel cell stack, where the electrochemical conversion process directly produces electric power, a high temperature gas stream rich in $CO_2$ and steam, and a hot air stream.

Preliminary mass and energy balances for an integrated system 70 indicate that at projected power production efficiency for the system, a net surplus of electric power can readily be generated. System efficiencies identified for commercial application are expected to produce 1.5-3 MW of net electrical power for each ton of coal fuel, and 1-3 MW of process heat that will be available for use in combined heat and power applications, or to drive a micro-turbine for additional electrical power generation. If combined with modern gas turbine systems, the exportable electrical power could exceed 3 MW per ton of coal. Integrating the ICP coal reforming process and advanced fuel cell technologies offers a number of potential benefits, which could provide a unique small-scale solution for excess power generation capabilities of 0.5-40 MW of electric power, based on the use of coal and/or coal/methane feedstocks. The system is well suited for small and medium-scale gasification applications (less than 100 MW) and can be closely integrated with fuel cells for reuse of the combustion energy and partial recycle of the steam exhaust stream. Unlike conventional partial oxidation systems, which operate at pressures of between 300-1200 psi, system 70 operates at much lower pressures (1-10 atmospheres), which matches the operating requirements for fuel cells and significantly reduces capital costs for the system. Energy conservation and recovery are significant design criteria for the integration of system 70. Sensible heat in the fuel gas streams exiting the ICP reformer and in the gas streams from the fuel cell stack, and the unreacted fuel gas from the fuel cell stack are used for feed preheat, generation of process steam, and for use in combined heat and power applications.

Thus, the ICP reforming process offers a low-pressure gasification system that matches the pressure requirements of high-temperature fuel cell systems. In comparison with conventional partial oxidation processes, the present invention produces a fuel gas with fewer diluents for use by the fuel cells. The reducing atmosphere within the ICP reformer prevents the formation of oxidized species, such as $SO_x$ and $NO_x$. Instead, sulfur and nitrogen in the feedstocks are primarily converted into hydrogen sulfide gas, ammonia, and nitrogen gas. Furthermore, system 70 operates without requiring catalysts, which are generally a challenge in partial oxidation systems, because such catalysts are readily "poisoned" by sulfur. Thus, high sulfur containing feed materials, such as high sulfur coal, can be directly processed. The overall savings related to choice of materials for construction and savings related to processing consumables (no catalysts are required) are expected to significantly reduce installation and operating costs in an integrated coal-to-energy plant in accord with the present invention.

Figure 9:
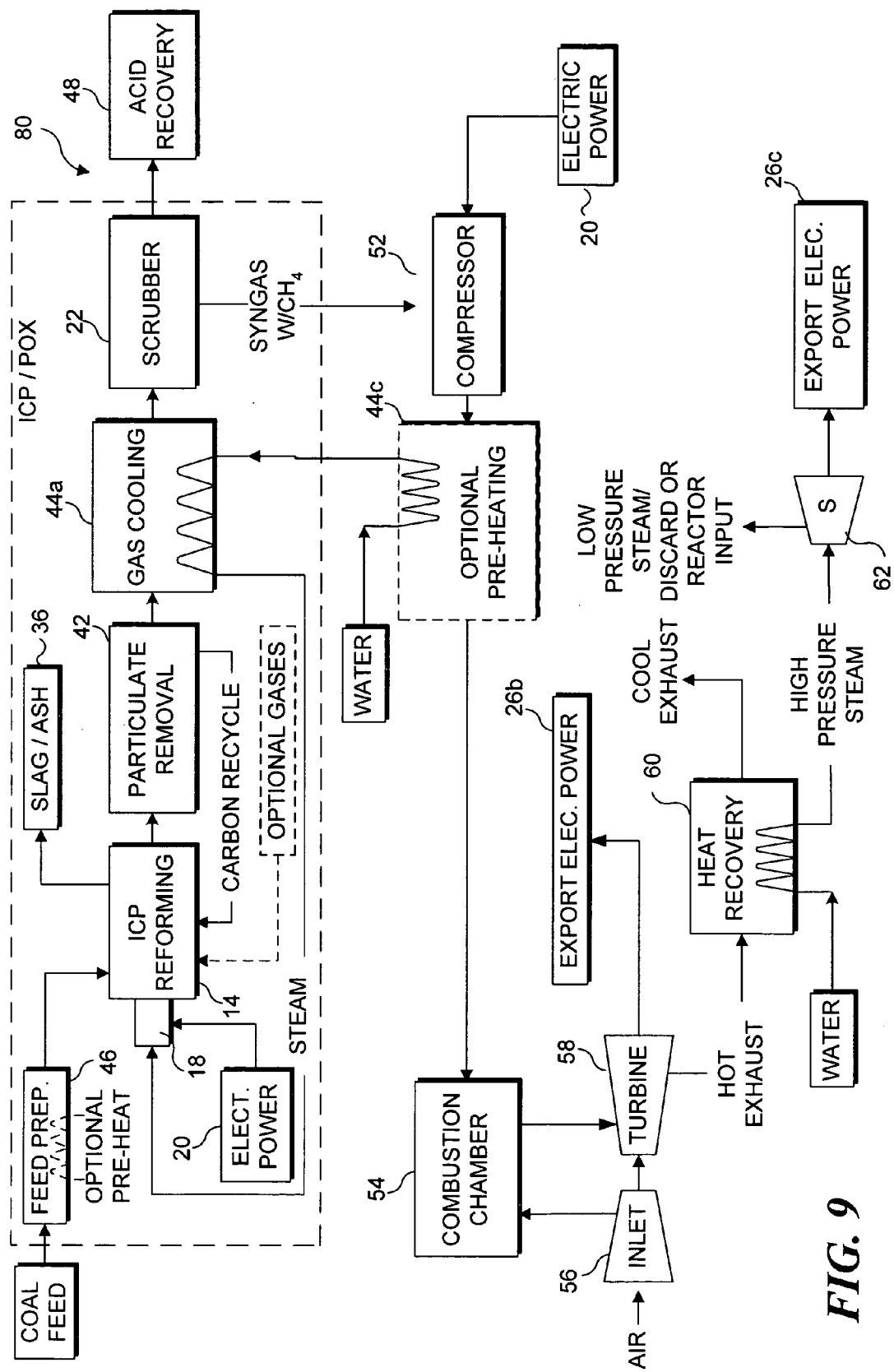
FIG. 9 is a detailed process flow diagram for an ICP-based distributed power system, in which gas and steam turbines are used to generate electrical power.

FIG. 9 illustrates an ICP-based distributed electric power generating system 80, which is similar to system 10b illustrated in FIG. 6. However, system 80 does not include fuel cells. Instead, the fuel gas produced in reaction vessel 14 is conveyed to a combustion chamber 54. Thus, the electrical power produced by system 80 is produced by turbine 58, as indicated in block 26b, and by steam turbine 62, as indicated by block 26c. Electrical power is consumed in system 80 by ICP torch 18 and compressor 52. A pre-heating system 44c can be employed to pre-heat the cooled and compressed fuel gas if desired. Pre-heating system 44c can be configured to use waste heat from gas cooling system 44a. Pre-heating may be useful where gas cooling system 44a cools the fuel gas to a temperature required by scrubber 22, and that temperature is below a desirable temperature for the cleaned fuel gas that is to be introduced into combustion chamber 54.

Figure 10:
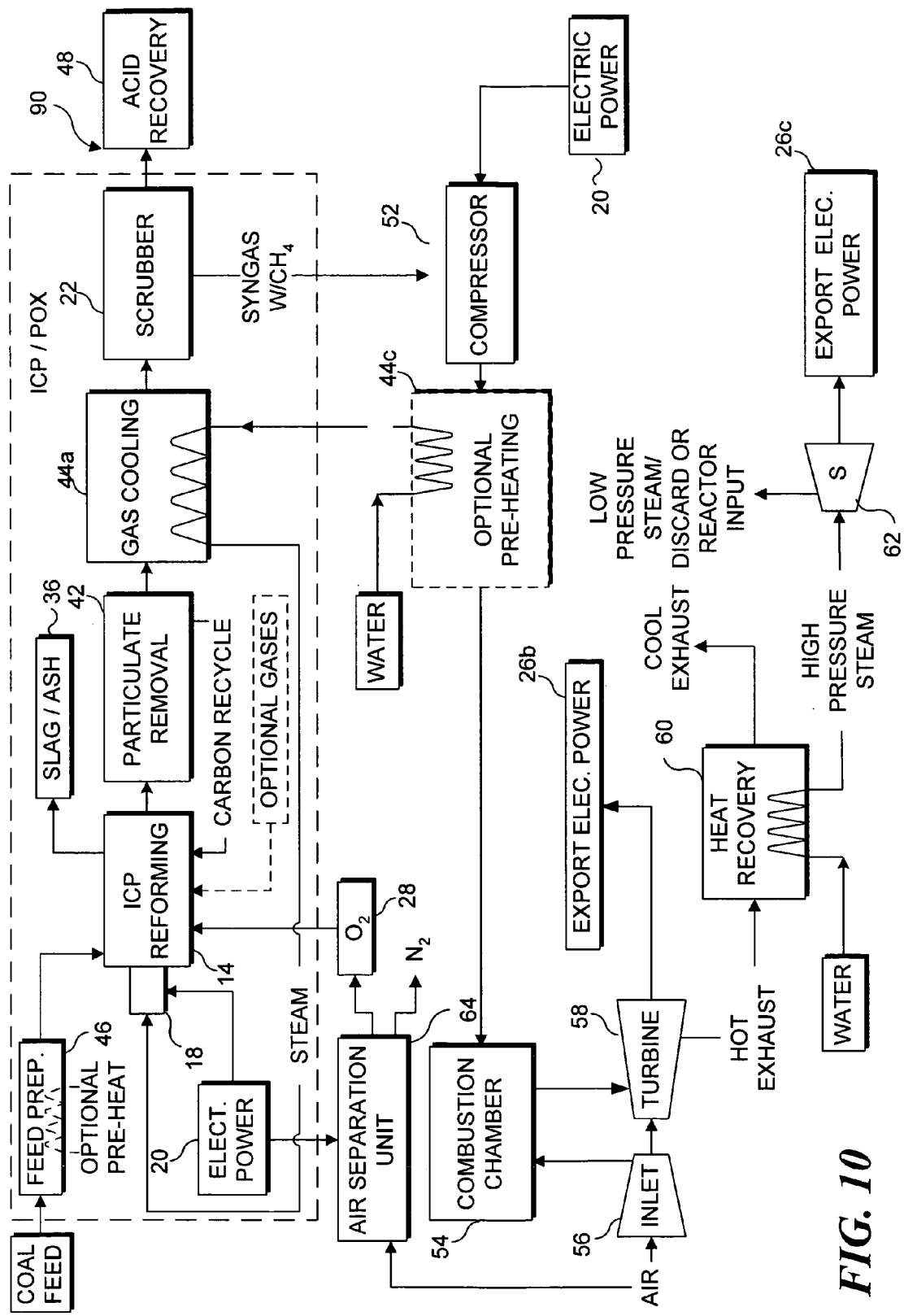
FIG. 10 is a process flow diagram very similar to that of FIG. 9, differing in the incorporation of systems enabling partial oxidation conditions to exist within the ICP reactor, thereby enhancing the overall efficiency of the ICP-based distributed power system.

FIG. 10 illustrates ICP-based distributed electric power generating system 90, which is generally the same as system 80 in FIG. 9, but with the addition of air separation unit 64 to provide oxygen to create a partial oxidation condition inside reaction vessel 14a. System 90 is thus more efficient than system 80, because ICP torch 18 will consume less electrical power in system 90 than in system 80.

FIGS. 11-14B illustrate various embodiments of reaction vessels that can be used to reform different carbonaceous compounds into the fuel gas used in electrical generators of the present invention. Each of the reactors described below is designed to operate at temperatures from about 400° C. to over 1000° C., at a pressure ranging from about 1 to 10 atmospheres. Preferably, each reactor operates at or near atmospheric pressure.

Figure 11:
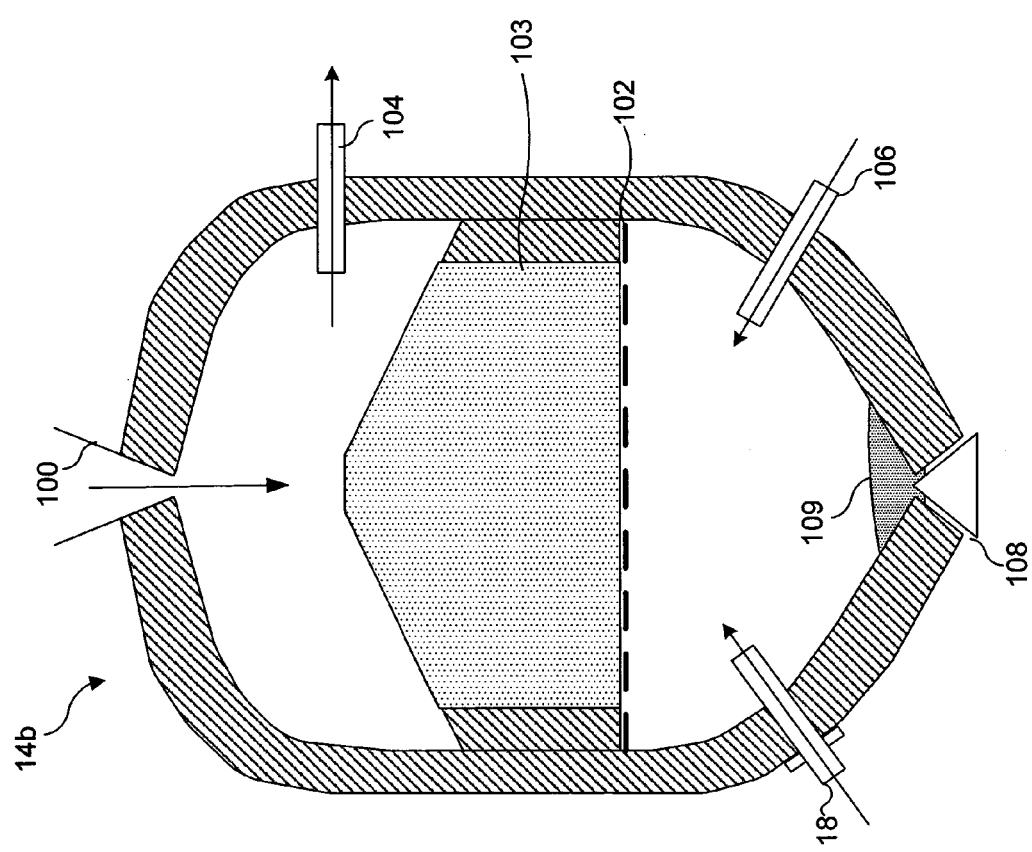
FIG. 11 is a schematic longitudinal cross-sectional view of a fixed bed reaction vessel.

FIG. 11 illustrates an ICP reaction vessel 14b. The orientation of reaction vessel 14b is vertical, with the carbonaceous fuel being injected into the reactor via a feed port 100 disposed at the top of the reactor. In embodiments where the reaction material is granular, a grid or mesh 102 is inserted approximately two-thirds of the way down into the core of the reactor, to prevent the feedstock material from passing through the reactor before it has had a chance to be reformed by the ICP. Thus, mesh 102 supports a feed bed 103. It should be understood that the grid or mesh must be located sufficiently close to ICP torch 18 so that the feedstock material is disposed in the vicinity of the energetic plasma, which drives the endothermic reforming reaction. This particular embodiment of the reactor is particularly well suited to use of a granular type of feedstock. Because of the vertical orientation, a pumping mechanism is not required for the feedstock, and it can employ a gravity feed. Once the feedstock material has been reformed into the fuel gas product, slag and ash 109 pass through grid/mesh 102 and exit the reactor via a slag/ash port 108. To maintain temperature conditions in the reactor, the slag/ash port can include a valve that periodically opens, enabling the slag/ash to be removed from the reactor.

The walls of the reactor can be lined with a refractory material as is well understood in the art of reactor design. An outlet 104 located near the top of the reactor is provided to enable the reformed fuel gas to exit reaction vessel 14b. One or more feed ports 106 are optionally included to enable additional process gases, such as steam, carbon dioxide, or other hydrocarbons to be injected into reaction vessel 14b. It should be also understood that more than one ICP torch 18 can be provided. Reactor 14b can accommodate carbonaceous materials in solid form, granular form, and/or as a slurry/sludge. In a particularly preferred embodiment, the feed material comprises pulverized coal.

Figures 12A, 12B:
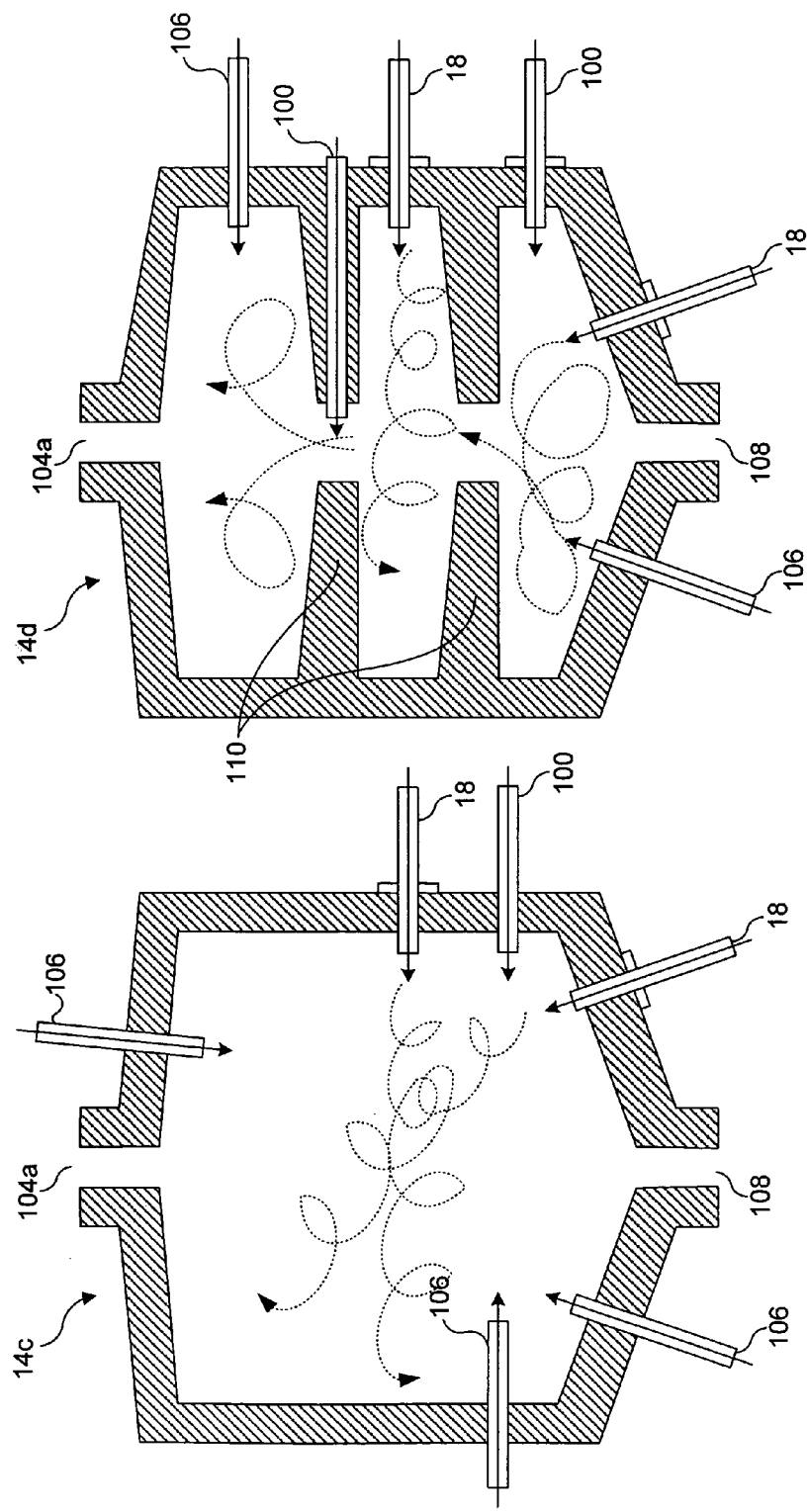
FIG. 12A is a schematic longitudinal cross-sectional view of an entrained flow reaction vessel.
FIG. 12B is a schematic longitudinal cross-sectional view of an entrained flow reaction vessel that includes baffles to increase turbulent flow within the reaction vessel.

FIG. 12A illustrates an entrained flow reactor 14c that can accept feedstock in the form of solids, particulates, slurry, liquids, gases, or a combination thereof. The feedstock is injected through a feed port 100. As discussed above, feed port 100 is disposed close to one or more ICP torches 18. Additional product gases can be injected through ports 106. Ports 106 are located at various angles and locations to promote turbulent mixing of the materials within reactor 14c. Fuel gas products exit the reactor via gas outlet 104a, while slag and ash exit via outlet 108. Reactor 14c can have a wide range of length-to-diameter ratios and can be oriented either vertically or horizontally, as long as slag/ash removal port 108 is disposed at the bottom to enable the slag and ash to be removed by gravity flow. As before, the reactor wall can be lined with refractory material and/or a water jacket can encapsulate the reactor for cooling and/or generation of steam.

FIG. 12B illustrates a very similar entrained flow reactor 14d, which includes a plurality of baffles 110 that are designed to promote turbulent mixing inside the reactor.

Figure 13:
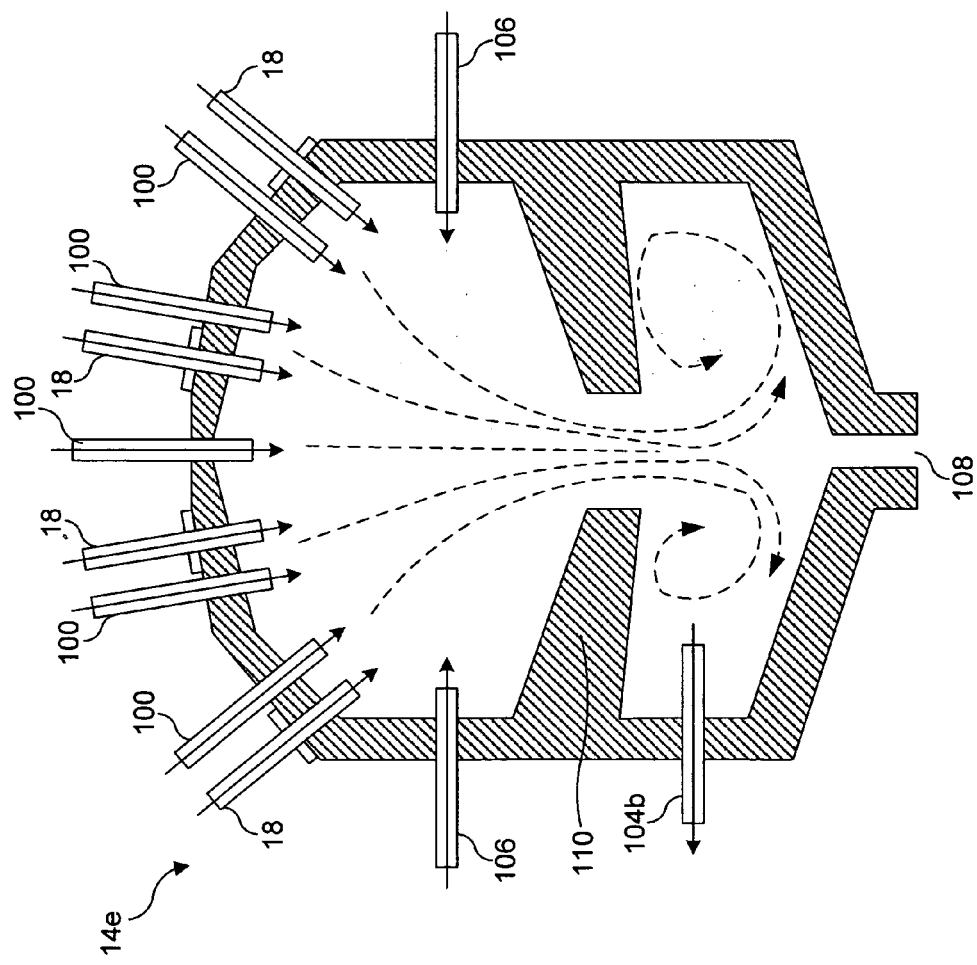
FIG. 13 is a schematic longitudinal cross-sectional view of a down-fired, entrained flow reaction vessel.

FIG. 13 illustrates a down-fired reactor 14e. In down-fired reactor 14e, one or more ICP torches 18 are disposed at the top of the reactor, with the plasma jet directed inwardly and downwardly. One or more feed ports 100 are disposed adjacent to the ICP torches, so that as soon as the feedstock enters the reactor it encounters the energetic plasma to begin the reforming process. As before, a plurality of ports 106 are available to inject additional process gases if required. The reformed fuel gas exits via an outlet 104c (disposed in a lower portion of the reactor), while slag and ash drop downwardly through the reactor and exit through the bottom via slag/ash removal 108. Again, the interior surfaces of the reactor can be lined with refractory material, and the reactor can be partially covered with a water jacket to produce steam. As illustrated, a plurality of baffles are oriented at a slight downward angle to help direct the flow of slag and ash towards outlet 108. The angles of these baffles can be varied to optimize this function. Again, different length-to-diameter ratios can be used to vary the size and volume of reactor 14e.

Figure 14B:
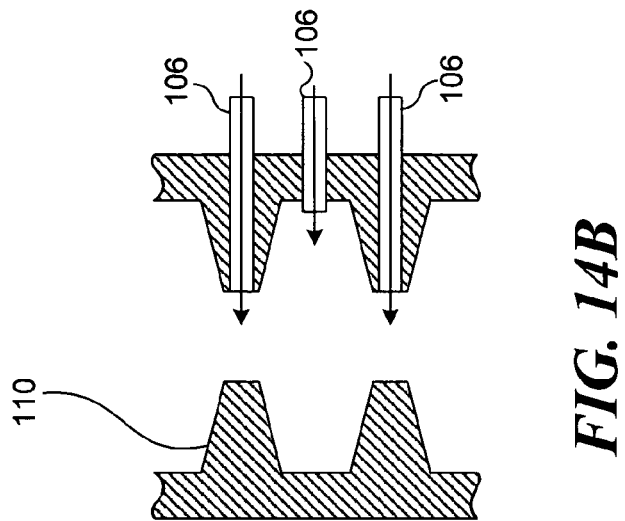
FIG. 14B is a schematic longitudinal cross-sectional view of a fluidized bed reaction vessel that includes baffles to increase turbulent flow within the reaction vessel.
Figure 14A:
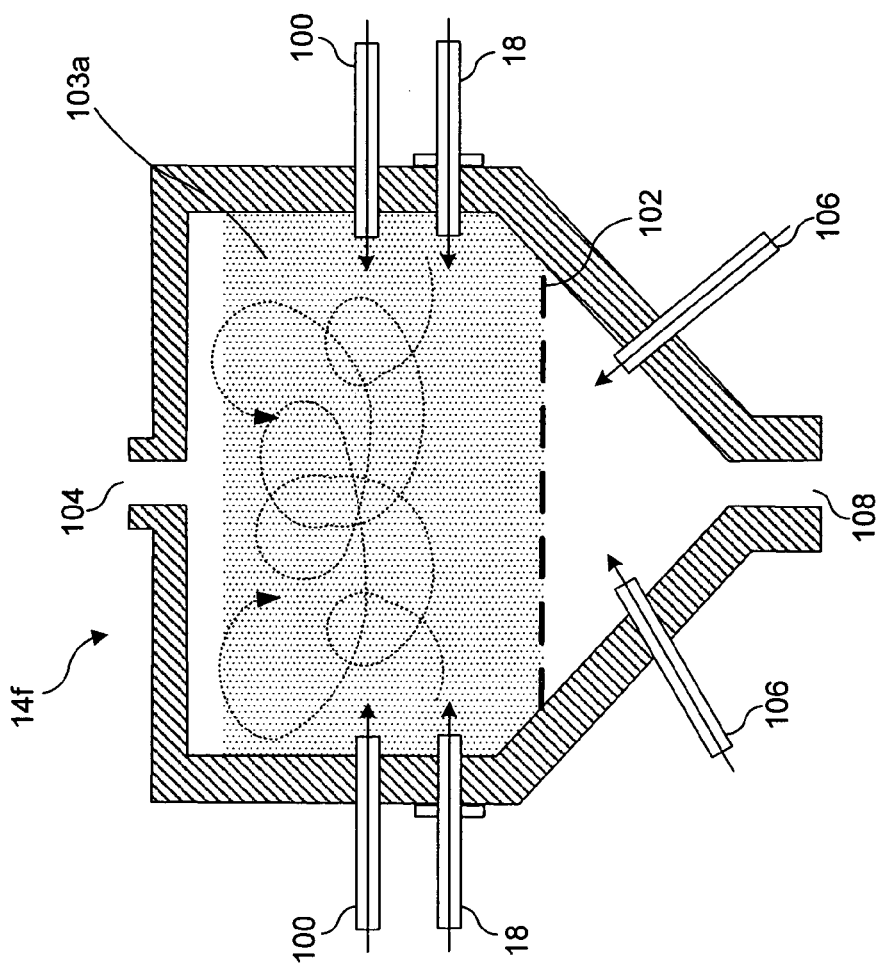
FIG. 14A is a schematic longitudinal cross-sectional view of a fluidized bed reaction vessel.

FIG. 14A illustrates a fluidized bed reactor 14f, which can accept feed in the form of solids, particulates, slurry, liquids, gases, or a combination thereof. The orientation can be either vertical or horizontal. However, if this is the case, then the location of a mesh/grid 102 will be changed to insure that the proper fluidized bed orientation is maintained. The feedstock enters through a feed port 100, which is located close to one or more ICP torches 18. Preferably, these inlet and ICP torches are located close to the fluidized bed, which is supported over mesh/grid 102. Product gases exit via outlet 104, and slag and ash are removed as before, via outlet 108. A plurality of different process gases can be injected into the reactor through inlets 106. FIG. 14B illustrates baffles 110 that be incorporated into fluidized bed reactor 14f. Additional process gas ports can be directed through the baffles, if desired.

While none of the reactor designs described in FIGS. 11-14B specifically include an inlet port for an oxidizer, it should be understood that any of inlet ports 106 could be employed to inject an oxidizing substance, such as oxygen or air, into any one of the reactors discussed above, to generate a partial oxidation environment.

Exemplary Reactions

It should be noted that the term "syngas" (or synthesis gas) can be used interchangeably with the term "fuel gas." Synthesis gas is conventionally produced by several different processes, and each process generates a different percentage mixture of $H_2$ and CO. Standard practice in the industry is to express the synthesis mixture as the ratio of $H_2$ to CO ($H_2$:CO). This ratio is very relevant in determining the kinds of products most appropriately produced from a particular synthesis gas. While there are methods to vary this ratio once the synthesis gas is produced, these ratio enhancement methods require additional investment in equipment and additional process steps.

Synthesis gas technology generally yields a product whose $H_2$:CO ratio varies from as high as 6:1 to as low as 3:2. There are some applications for synthesis gas in which excess $H_2$ is desired, but more frequently, CO is the more useful component of synthesis gas and thus, a lower ratio is more desirable. For example, renewed interest by the chemical industry in the Fisher-Tropsch process for synthesizing liquid fuels, such as gasoline, represents a potentially large market for a synthesis gas in which the $H_2$:CO ratio is about 2:1. Additionally, market studies show that the demand for CO is likely to increase dramatically over the next 10 years. The ability to employ the same process equipment to produce a range of syngas having components in different ratios is highly desirable.

The following exemplary reactions illustrate how fuel gases having different compositions can be produced by selecting different feedstock materials and different plasma gases.

The reaction of ionized steam ($H_2O$) with a generic hydrocarbon (characterized by the general formula $C_aH_b$) is as follows:

$$(1) \; C_aH_b + (a) \, H_2O + ENERGY \rightarrow (a) \, CO + (a+b/2) \, H_2 \quad (1)$$

Equation (1) illustrates that steam can be used as a plasma gas. The resulting fuel gas product will have traces of $H_2O$, $CO_2$, and soot. The soot can readily be removed by gas conditioning equipment. If the original hydrocarbon ($C_aH_b$) included sulfur or chlorine, then acid gases would also be generated, which again can be readily removed using conventional gas conditioning technologies. Note that hydrocarbon $C_aH_b$ generally approximates the average formula of many oils, oily wastes, oil sludges, (marine) diesel, tars, and plastics (which are complex mixtures of hydrocarbon compounds).

The reaction of $CO_2$ with a generic hydrocarbon (characterized by the general formula $C_aH_b$) is as follows:

$$(1) \; C_aH_b + (a)CO_2 + ENERGY \rightarrow (2a) \, CO + (1/2b) \, H_2 \quad (2)$$

Equation (2) illustrates that $CO_2$ can be used as a plasma gas. The fuel gas product is rich in carbon monoxide, but at a lower $H_2$:CO ratio compared to Equation (1). Those of ordinary skill in the chemical arts will readily recognize that the relative proportions of hydrogen and carbon monoxide in the fuel gas product can be manipulated by introducing different amounts of steam and carbon dioxide into the ICP based reaction vessel.

The reaction of one mole of ionized $H_2O$ (steam) plasma with one mole of methane ($CH_4$) produces one mole of CO and three moles of $H_2$:

$$(1)\ CH_4 + (1)\ H_2O + ENERGY \rightarrow (1)\ CO + (3)\ H_2 \quad (3)$$

Such a reaction transforms methane (the primary constituent in natural gas) into a hydrogen rich syngas, resulting in an $H_2$:CO ratio of 3:1.

The reaction of one mole of methane ($CH_4$) with one mole of ionized $CO_2$ plasma produces two moles of CO and two moles of $H_2$:

$$(1)\ CH_4 + (1)\ CO_2 + ENERGY \rightarrow (2)\ CO + (2)\ H_2 \quad (4)$$

$CO_2$ plasma reforming of methane produces a fuel gas at an $H_2$:CO ratio of 1:1, which is a lower ratio as compared to steam plasma reforming. The ICP reforming technology enables the production of any syngas ratio within this range (3:1 to 1:1) by combining $CO_2$ and steam as plasma gases.

Accordingly, the reaction of two moles of methane with one mole of steam ($H_2O$) and one mole of carbon dioxide ($CO_2$) increases the $H_2$:CO ratio to 5:3 (or 1.7:1), as shown by the following equation:

$$(2)\ CH_4 + (1)\ CO_2 + (1)\ H_2O + ENERGY \rightarrow (3)\ CO + (5)\ H_2 \quad (5)$$

As noted above, pulverized coal is expected to be a preferred feedstock. While coal has a more complicated structural formula than pure carbon, coal is primarily carbon, so for simplicity, it is represented below simply as "C." A typical elemental analysis of a bituminous coal is 82% carbon, 5% hydrogen, 1% nitrogen, 3% sulfur, and 9% oxygen by weight. A more detailed analysis of coal, and the constituents of an ICP reformed coal based fuel gas are included in Appendix A. The reforming of coal in an ICP reactor using steam as a plasma gas can thus be simplified as:

$$(1)\ C + (1)\ H_2O + ENERGY \rightarrow (1)\ CO + (1)\ H_2 \quad (6)$$

Of course, additional constituents of coal will result in additional byproducts, but the hydrogen and carbon monoxide fuel gas shown above will still be the predominant product at an approximate $H_2$:CO ratio of 1:1.

Carbon dioxide can also be used as a plasma gas to reform coal, as represented by:

$$(1)\ C + (1)\ CO_2 + ENERGY \rightarrow (2)\ CO \quad (7)$$

The resulting fuel gas is a CO rich syngas with almost no hydrogen (however, since coal does include 5% hydrogen, traces of hydrogen will be present in the fuel gas). As such, it is a suitable fuel gas for power production (particularly for use with turbines and combustion engines), but this process variation can also be employed for producing carbon monoxide for industrial usage, as is disclosed in commonly assigned U.S. Pat. No. 6,153,852, which has above already been specifically incorporated herein by reference.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for producing a net surplus of electrical power from a carbonaceous feedstock, by reforming the carbonaceous feedstock into a fuel gas suitable for use in an electrical generator, such that substantially more electrical power is produced than is consumed, comprising the steps of:
   (a) providing a system configured to reform the carbonaceous feedstock into the fuel gas and to use the fuel gas to generate electrical power, the system comprising an inductively coupled plasma (ICP) torch and the electrical generator;
   (b) using the ICP torch to reform the carbonaceous feedstock into the fuel gas suitable for use in the electrical generator, the carbonaceous feedstock having been selected such that substantially more electrical power can be produced by the fuel gas than is consumed by operating the system wherein the plasma gas used to generate the ICP has no fuel value until it has been reformed;
   (c) introducing the fuel gas into an electrical generator;
   (d) using the fuel gas in the electrical generator to produce a first quantity of electrical power that is utilized to operate the system, and a second quantity of electrical power that corresponds to the net surplus of electrical power; and
   (e) distributing the second quantity of electrical power to be used for purposes other than operating the system.

2. The method of claim 1, wherein the step of using the fuel gas in the electrical generator to produce the second quantity of electrical power comprises the step of producing more than one megawatt of electrical power per ton of carbonaceous feedstock.

3. The method of claim 1, wherein the electrical generator comprises a fuel cell.

4. The method of claim 3, further comprising the steps of:
   (a) using a high temperature exhaust from the fuel cell to generate steam; and
   (b) using the steam to generate an additional quantity of surplus electrical power.

5. The method of claim 3, wherein the high temperature exhaust from the fuel cell includes combustible gases, further comprising the steps of:
   (a) introducing the high temperature exhaust from the fuel cell into a combustion-based electrical generator; and
   (b) using the high temperature exhaust from the fuel cell in the combustion-based electrical generator to produce an additional quantity of distributed electrical power.

6. The method of claim 5, further comprising the step of compressing the high temperature exhaust from the fuel cell before introducing the exhaust from the fuel cell into the combustion-based electrical generator.

7. The method of claim 1, further comprising the step of using a plasma gas to generate the ICP, wherein the plasma gas has no fuel value until it has been reformed, thereby increasing the second quantity of electrical power that is generated.

8. The method of claim 1, wherein all of the fuel gas generated by reforming the carbonaceous feedstock is used to generate the first and second quantities of electrical power, thereby increasing the second quantity of power that is generated.

9. The method of claim 1, wherein the first quantity of electrical power is required to operate the system, further comprising the step of reducing an amount of the first quantity of electrical power required to operate the system by using an oxidizer when performing the step of using the ICP to reform the carbonaceous feedstock.

10. The method of claim 9, further comprising the steps of:
   (a) employing a portion of the first quantity of electrical power generated by the electrical generator using the fuel gas reformed by the ICP, to separate air into an oxygen fraction and at least one other fraction; and
   (b) using the oxygen fraction for the oxidizer.

11. The method of claim 1, wherein the efficiency of the system is increased by maintaining a non-reducing atmosphere in a reaction chamber where the carbonaceous material is reformed by the ICP, thereby increasing the second quantity of electrical power that is generated.

12. The method of claim 1, further comprising the step of using carbon dioxide as a plasma gas to produce the ICP.

13. The method of claim 1, further comprising the step of using steam as a plasma gas to produce the ICP.

14. The method of claim 1, wherein the carbonaceous feedstock is coal, further comprising the step of pulverizing the coal before the step of using the ICP to reform the carbonaceous feedstock.

15. The method of claim 1, wherein the carbonaceous feedstock is natural gas, and the electrical generator comprises a fuel cell, such that the ICP reforms the natural gas into a fuel gas that is used to energize the fuel cell.

16. The method of claim 1, wherein the carbonaceous feedstock comprises at least one of natural gas, marine diesel, coal, waste oils, chlorinated hydrocarbons, refinery wastes, hydrocarbon waste, and plastics.

17. The method of claim 1, wherein the electrical generator comprises at least one of a combustion-based electrical generator, and a fuel cell.

18. The method of claim 17, wherein the combustion-based electrical generator comprises at least one of a turbine, an internal combustion engine, and an external combustion engine.

19. The method of claim 17, wherein the fuel cell comprises at least one of a molten carbonate fuel cell, and a solid oxide fuel cell.

20. A method for producing a net surplus of electrical power from a carbonaceous feedstock, by reforming the carbonaceous feedstock into a fuel gas suitable for use in an electrical generator that produces electrical power, such that substantially more electrical power is produced than is consumed, comprising the steps of:
   (a) using an inductively coupled plasma (ICP) to reform the carbonaceous feedstock into a fuel gas suitable for use in an electrical generator to produce electrical power, the carbonaceous feedstock having been selected such that substantially more electrical power can be produced by the fuel gas than is consumed by generating the ICP wherein the plasma gas used to generate the ICP is non-combustible;
   (b) introducing the fuel gas into a first electrical generator, the first electrical generator using the fuel gas to produce a first quantity of electrical power and an exhaust gas stream that includes combustible gases;
   (c) compressing the exhaust gas stream; and
   (d) introducing the exhaust gas stream into a second electrical generator, the second electrical generator combusting the exhaust gas stream to produce a second quantity of electrical power, the first and second quantity of electrical power in combination exceeding the electrical power consumed to generate the ICP.

21. The method of claim 20, wherein the second electrical generator produces a hot exhaust gas stream, further comprising the steps of:
   (a) using the hot exhaust gas stream to generate steam; and
   (b) using the steam to generate a third quantity of electrical power.

22. The method of claim 20, wherein the carbonaceous feedstock cannot be used as a fuel for the electrical generator without first being reformed.

23. The method of claim 20, wherein the step of using the ICP to reform the carbonaceous feedstock comprises the step of reforming the carbonaceous feedstock under substantially atmospheric pressure conditions.

24. A method for producing a net surplus of electrical power from coal using an electrical generator that cannot use coal directly as a fuel source, such that substantially more electrical power is generated than is consumed, comprising the steps of:
   (a) providing a system configured to reform the call into a fuel gas and to use that fuel gas to generate electrical power, the system comprising an inductively coupled plasma (ICP) torch, and an electrical generator;
   (b) using the ICP torch to reform the coal into the fuel gas, the quality of the coal having been selected such that substantially more electrical power can be produced by the fuel gas than is consumed by operating the system wherein the plasma gas used to generate the ICP is not a fuel gas;
   (c) introducing the fuel gas into the electrical generator;
   (d) using the fuel gas to produce a first quantity of electrical power that is utilized to operate the system, and a second quantity of electrical power that corresponds to the net surplus of electrical power, such that the second quantity of electrical power is substantially as large as or larger than the first quantity of electrical power; and
   (e) distributing the second quantity of electrical power to be used for purposes other than operating the system.

25. The method of claim 24, wherein the step of using the ICP to reform the coal comprises the step of reforming the coal under substantially atmospheric pressure conditions.

26. The method of claim 24, wherein the electrical generator comprises a fuel cell.

27. The method of claim 26, further comprising the steps of:
   (a) using a high temperature exhaust from the fuel cell to generate steam; and
   (b) using the steam to increase the second quantity of electrical power.

28. The method of claim 26, wherein the exhaust from the fuel cell includes combustible gases, further comprising the steps of:
   (a) introducing the exhaust from the fuel cell into a combustion-based electrical generator; and
   (b) using the exhaust from the fuel cell to increase the second quantity of electrical power with the combustion-based electrical generator.

29. The method of claim 24, further comprising the step of reducing an amount of electrical power required to maintain the ICP, by using an oxidizer when performing the step of using the ICP to reform the coal.

* * * * *